(12) United States Patent
Dunn et al.

(10) Patent No.: US 11,921,010 B2
(45) Date of Patent: Mar. 5, 2024

(54) DISPLAY ASSEMBLIES WITH DIFFERENTIAL PRESSURE SENSORS

(71) Applicant: Manufacturing Resources International, Inc., Alpharetta, GA (US)

(72) Inventors: William Dunn, Alpharetta, GA (US); Mike Brown, Cumming, GA (US); Douglas Bennett, Alpharetta, GA (US); Kevin O'Connor, Duluth, GA (US); Alex Moreau, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 17/872,756

(22) Filed: Jul. 25, 2022

(65) Prior Publication Data

US 2023/0029615 A1 Feb. 2, 2023

Related U.S. Application Data

(60) Provisional application No. 63/240,246, filed on Sep. 2, 2021, provisional application No. 63/235,986, filed
(Continued)

(51) Int. Cl.
*G01M 3/26* (2006.01)
*G02F 1/13* (2006.01)
(Continued)

(52) U.S. Cl.
CPC ............ *G01M 3/26* (2013.01); *G02F 1/1309* (2013.01); *G02F 1/133385* (2013.01); *G02F 1/133331* (2021.01); *G02F 1/133603* (2013.01)

(58) Field of Classification Search
CPC ........ G01M 3/3263; G01M 3/00; G01M 3/02; G01M 3/3272; G09F 13/00–46
(Continued)

(56) References Cited

U.S. PATENT DOCUMENTS 3,504,528 A * 4/1970 Trier .................. G01M 3/3263
73/49.3
3,807,220 A * 4/1974 Ottenstein ............... G01M 3/02
73/1.17
(Continued)

FOREIGN PATENT DOCUMENTS

AU 2016321400 B2 9/2019
CN 203277867 U 11/2013
(Continued)

OTHER PUBLICATIONS

Photo Research, Inc., PR®-650 SpectraScan® Colorimeter, 1999, 2 pages.
(Continued)

*Primary Examiner* — David A. Rogers
(74) *Attorney, Agent, or Firm* — Standley Law Group LLP; Jeffrey S. Standley; Adam J. Smith

(57) ABSTRACT

Electronic display assemblies providing enhanced leak detection, and systems and methods related to the same, are provided. A differential pressure sensor detects a differential pressure between an ambient environment and a testing area of the electronic display assembly. A controller determines differential pressure readings based on data received from the differential pressure sensor and selectively generates electronic notifications based on said differential pressure readings.

19 Claims, 18 Drawing Sheets

Related U.S. Application Data on Aug. 23, 2021, provisional application No. 63/226,290, filed on Jul. 28, 2021.

(51) Int. Cl.
*G02F 1/1333* (2006.01)
*G02F 1/13357* (2006.01)

(58) Field of Classification Search
USPC .................................................. 73/40–49.8
See application file for complete search history.

(56) References Cited

U.S. PATENT DOCUMENTS

| | | | |
|---|---|---|---|
| 4,527,804 A * | 7/1985 | Spencer | F16J 15/004 |
| | | | 277/318 |
| 5,162,785 A | 11/1992 | Fagard | |
| 5,228,339 A * | 7/1993 | Maresca, Jr. | G01M 3/3245 |
| | | | 367/908 |
| 5,351,201 A | 9/1994 | Harshbarger, Jr. et al. | |
| 5,590,831 A | 1/1997 | Manson et al. | |
| 5,751,346 A | 5/1998 | Dozier et al. | |
| 5,786,801 A | 7/1998 | Ichise | |
| 5,952,992 A | 9/1999 | Helms | |
| 6,042,443 A * | 3/2000 | Carella | H01J 7/183 |
| | | | 445/24 |
| 6,144,359 A | 11/2000 | Grave | |
| 6,157,143 A | 12/2000 | Bigio et al. | |
| 6,215,411 B1 | 4/2001 | Gothard | |
| 6,222,841 B1 | 4/2001 | Taniguchi | |
| 6,259,492 B1 | 7/2001 | Imoto et al. | |
| 6,374,187 B1 | 4/2002 | Knight et al. | |
| 6,384,736 B1 | 5/2002 | Gothard | |
| 6,421,694 B1 | 7/2002 | Nawaz et al. | |
| 6,509,911 B1 | 1/2003 | Shimotono | |
| 6,526,807 B1 | 3/2003 | Doumit et al. | |
| 6,546,294 B1 | 4/2003 | Kelsey et al. | |
| 6,553,336 B1 | 4/2003 | Johnson et al. | |
| 6,556,258 B1 | 4/2003 | Yoshida et al. | |
| 6,587,525 B2 | 7/2003 | Jeong et al. | |
| 6,701,143 B1 | 3/2004 | Dukach et al. | |
| 6,753,842 B1 | 6/2004 | Williams et al. | |
| 6,771,795 B1 | 8/2004 | Isnardi | |
| 6,812,851 B1 | 11/2004 | Dukach et al. | |
| 6,821,179 B2 * | 11/2004 | Ando | H01J 29/862 |
| | | | 445/44 |
| 6,850,209 B2 | 2/2005 | Mankins et al. | |
| 6,955,170 B1 | 10/2005 | Mullins et al. | |
| 6,968,375 B1 | 11/2005 | Brown | |
| 7,007,545 B1 | 3/2006 | Martinek | |
| 7,038,186 B2 | 5/2006 | De Brabander et al. | |
| 7,064,672 B2 | 6/2006 | Gothard | |
| 7,319,862 B1 | 1/2008 | Lincoln et al. | |
| 7,330,002 B2 | 2/2008 | Joung | |
| 7,369,058 B2 | 5/2008 | Gothard | |
| 7,380,265 B2 | 5/2008 | Jensen et al. | |
| 7,391,317 B2 | 6/2008 | Abraham et al. | |
| 7,451,332 B2 | 11/2008 | Culbert et al. | |
| 7,474,294 B2 | 1/2009 | Leo et al. | |
| 7,516,223 B2 | 4/2009 | Whitehead | |
| 7,577,458 B2 | 8/2009 | Lin | |
| 7,581,094 B1 | 8/2009 | Apostolopoulos et al. | |
| 7,595,785 B2 | 9/2009 | Jang | |
| 7,612,278 B2 | 11/2009 | Sitrick et al. | |
| 7,614,065 B2 | 11/2009 | Weissmueller, Jr. et al. | |
| 7,636,927 B2 | 12/2009 | Zigmond et al. | |
| 7,658,787 B2 | 2/2010 | Morse et al. | |
| 7,675,862 B2 | 3/2010 | Pham et al. | |
| 7,679,279 B2 * | 3/2010 | Kamio | H01J 29/865 |
| | | | 445/25 |
| 7,751,813 B2 | 7/2010 | Varanda | |
| 7,764,280 B2 | 7/2010 | Shiina | |
| 7,774,633 B1 | 8/2010 | Harrenstien et al. | |
| 7,795,821 B2 | 9/2010 | Jun | |
| 7,882,728 B2 | 2/2011 | Kizaki et al. | |
| 7,889,852 B2 | 2/2011 | Whitehead | |
| 7,949,893 B1 | 5/2011 | Knaus et al. | |
| 8,074,627 B2 * | 12/2011 | Siddiqui | F02M 25/0818 |
| | | | 73/40 |
| 8,212,921 B2 | 7/2012 | Yun | |
| 8,218,812 B2 | 7/2012 | Sugimoto et al. | |
| 8,248,203 B2 | 8/2012 | Hanwright et al. | |
| 8,336,369 B2 | 12/2012 | Mahoney | |
| 8,351,014 B2 | 1/2013 | Dunn | |
| 8,441,574 B2 | 5/2013 | Dunn et al. | |
| 8,483,554 B2 * | 7/2013 | Takimoto | G03B 17/08 |
| | | | 73/45.5 |
| 8,601,252 B2 | 12/2013 | Mendelow et al. | |
| 8,612,608 B2 | 12/2013 | Whitehead | |
| 8,654,302 B2 | 2/2014 | Dunn et al. | |
| 8,689,343 B2 | 4/2014 | De Laet | |
| 8,767,165 B2 | 7/2014 | Dunn | |
| 8,854,595 B2 | 10/2014 | Dunn | |
| 8,881,576 B2 | 11/2014 | Schwartz et al. | |
| 8,983,385 B2 | 3/2015 | Macholz | |
| 9,026,686 B2 | 5/2015 | Dunn et al. | |
| 9,812,047 B2 | 11/2017 | Schuch et al. | |
| 10,120,498 B2 | 11/2018 | Gray | |
| 10,170,076 B2 | 1/2019 | Wang et al. | |
| 10,194,564 B2 | 1/2019 | Dunn et al. | |
| 10,296,108 B2 | 5/2019 | Gray et al. | |
| 10,311,763 B2 * | 6/2019 | Greenfield | G09F 13/16 |
| 10,325,536 B2 | 6/2019 | Schuch et al. | |
| 10,353,785 B2 | 7/2019 | Dunn et al. | |
| 10,398,066 B2 | 8/2019 | Dunn et al. | |
| 10,485,113 B2 | 11/2019 | Dunn et al. | |
| 10,593,175 B1 | 3/2020 | Jennings et al. | |
| 10,660,245 B2 | 5/2020 | Dunn et al. | |
| 10,706,752 B2 * | 7/2020 | Greenfield | E01F 9/688 |
| 10,908,863 B2 | 2/2021 | Newnham et al. | |
| 11,093,355 B2 | 8/2021 | Dunn et al. | |
| 11,131,453 B2 * | 9/2021 | Kim | G06F 3/0412 |
| 11,137,847 B2 | 10/2021 | Dunn | |
| 11,243,733 B2 | 2/2022 | Newnham et al. | |
| 11,402,940 B2 | 8/2022 | Dunn | |
| 2002/0019933 A1 | 2/2002 | Friedman et al. | |
| 2002/0026354 A1 | 2/2002 | Shoji et al. | |
| 2002/0065046 A1 | 5/2002 | Mankins et al. | |
| 2002/0112026 A1 | 8/2002 | Fridman et al. | |
| 2002/0120721 A1 | 8/2002 | Eilers et al. | |
| 2002/0147648 A1 | 10/2002 | Fadden et al. | |
| 2002/0152425 A1 | 10/2002 | Chaiken et al. | |
| 2002/0163513 A1 | 11/2002 | Tsuj | |
| 2002/0163916 A1 | 11/2002 | Oskouy et al. | |
| 2002/0164962 A1 | 11/2002 | Mankins et al. | |
| 2002/0190972 A1 | 12/2002 | Ven de Van | |
| 2002/0194365 A1 | 12/2002 | Jammes | |
| 2002/0194609 A1 | 12/2002 | Tran | |
| 2003/0031128 A1 | 2/2003 | Kim et al. | |
| 2003/0039312 A1 | 2/2003 | Horowitz et al. | |
| 2003/0061316 A1 | 3/2003 | Blair et al. | |
| 2003/0097497 A1 | 5/2003 | Esakov | |
| 2003/0098881 A1 | 5/2003 | Nolte et al. | |
| 2003/0115591 A1 | 6/2003 | Weissmueller, Jr. et al. | |
| 2003/0117714 A1 | 6/2003 | Nakamura et al. | |
| 2003/0132514 A1 * | 7/2003 | Liebeskind | B81B 7/0038 |
| | | | 257/E23.137 |
| 2003/0161354 A1 | 8/2003 | Bader et al. | |
| 2003/0177269 A1 | 9/2003 | Robinson et al. | |
| 2003/0192060 A1 | 10/2003 | Levy | |
| 2003/0196208 A1 | 10/2003 | Jacobson | |
| 2003/0214242 A1 | 11/2003 | Berg-johansen | |
| 2003/0230991 A1 | 12/2003 | Muthu et al. | |
| 2004/0036697 A1 | 2/2004 | Kim et al. | |
| 2004/0138840 A1 | 7/2004 | Wolfe | |
| 2004/0158872 A1 | 8/2004 | Kobayashi | |
| 2004/0194131 A1 | 9/2004 | Ellis et al. | |
| 2004/0243940 A1 | 12/2004 | Lee et al. | |
| 2004/0252400 A1 | 12/2004 | Blank et al. | |
| 2004/0253947 A1 | 12/2004 | Phillips et al. | |
| 2005/0033840 A1 | 2/2005 | Nisani et al. | |
| 2005/0070335 A1 | 3/2005 | Jitsuishi et al. | |
| 2005/0071252 A1 | 3/2005 | Henning et al. | |
| 2005/0073518 A1 | 4/2005 | Bontempi | |

(56) References Cited

U.S. PATENT DOCUMENTS

| | | |
|---|---|---|
| 2005/0088984 A1 | 4/2005 | Chin et al. |
| 2005/0123001 A1 | 6/2005 | Craven et al. |
| 2005/0132036 A1 | 6/2005 | Jang et al. |
| 2005/0179554 A1 | 8/2005 | Lu |
| 2005/0184983 A1 | 8/2005 | Brabander et al. |
| 2005/0216939 A1 | 9/2005 | Corbin |
| 2005/0231457 A1 | 10/2005 | Yamamoto et al. |
| 2005/0267943 A1 | 12/2005 | Castaldi et al. |
| 2005/0289061 A1 | 12/2005 | Kulakowski et al. |
| 2005/0289588 A1 | 12/2005 | Kinnear |
| 2006/0007107 A1 | 1/2006 | Ferguson |
| 2006/0022616 A1 | 2/2006 | Furukawa et al. |
| 2006/0150222 A1 | 7/2006 | McCafferty et al. |
| 2006/0160614 A1 | 7/2006 | Walker et al. |
| 2006/0269216 A1 | 11/2006 | Wiemeyer et al. |
| 2007/0039028 A1 | 2/2007 | Bar |
| 2007/0154060 A1 | 7/2007 | Sun |
| 2007/0157260 A1 | 7/2007 | Walker |
| 2007/0168539 A1 | 7/2007 | Day |
| 2007/0200513 A1 | 8/2007 | Ha et al. |
| 2007/0214812 A1 | 9/2007 | Wagner et al. |
| 2007/0237636 A1 | 10/2007 | Hsu |
| 2007/0268241 A1 | 11/2007 | Nitta et al. |
| 2007/0273519 A1 | 11/2007 | Ichikawa et al. |
| 2007/0274400 A1 | 11/2007 | Murai et al. |
| 2007/0286107 A1 | 12/2007 | Singh et al. |
| 2007/0291198 A1 | 12/2007 | Shen |
| 2008/0008471 A1 | 1/2008 | Dress |
| 2008/0019147 A1 | 1/2008 | Erchak et al. |
| 2008/0024268 A1 | 1/2008 | Wong et al. |
| 2008/0034205 A1 | 2/2008 | Alain et al. |
| 2008/0037466 A1 | 2/2008 | Ngo et al. |
| 2008/0037783 A1 | 2/2008 | Kim et al. |
| 2008/0055297 A1 | 3/2008 | Park |
| 2008/0096559 A1 | 4/2008 | Phillips et al. |
| 2008/0104631 A1 | 5/2008 | Krock et al. |
| 2008/0111958 A1 | 5/2008 | Kleverman et al. |
| 2008/0112601 A1 | 5/2008 | Warp |
| 2008/0136770 A1 | 6/2008 | Peker et al. |
| 2008/0163291 A1 | 7/2008 | Fishman et al. |
| 2008/0185976 A1 | 8/2008 | Dickey et al. |
| 2008/0218501 A1 | 9/2008 | Diamond |
| 2008/0246871 A1 | 10/2008 | Kupper et al. |
| 2008/0266554 A1 | 10/2008 | Sekine et al. |
| 2008/0267328 A1 | 10/2008 | Ianni et al. |
| 2008/0278099 A1 | 11/2008 | Bergfors et al. |
| 2008/0281165 A1 | 11/2008 | Rai et al. |
| 2008/0303918 A1 | 12/2008 | Keithley |
| 2008/0313691 A1 | 12/2008 | Cholas et al. |
| 2009/0009997 A1 | 1/2009 | Sanfilippo et al. |
| 2009/0015400 A1 | 1/2009 | Breed |
| 2009/0036190 A1 | 2/2009 | Brosnan et al. |
| 2009/0079416 A1 | 3/2009 | Vinden et al. |
| 2009/0104989 A1 | 4/2009 | Williams et al. |
| 2009/0129556 A1 | 5/2009 | Ahn |
| 2009/0152445 A1 | 6/2009 | Gardner, Jr. |
| 2009/0164615 A1 | 6/2009 | Akkanen |
| 2009/0273568 A1 | 11/2009 | Milner |
| 2009/0315867 A1 | 12/2009 | Sakamoto et al. |
| 2010/0017526 A1 | 1/2010 | Jagannath et al. |
| 2010/0037274 A1 | 2/2010 | Meuninck et al. |
| 2010/0060550 A1 | 3/2010 | McGinn et al. |
| 2010/0083305 A1 | 4/2010 | Acharya et al. |
| 2010/0149567 A1 | 6/2010 | Kanazawa et al. |
| 2010/0177157 A1 | 7/2010 | Stephens et al. |
| 2010/0177158 A1 | 7/2010 | Walter |
| 2010/0177750 A1 | 7/2010 | Essinger et al. |
| 2010/0198983 A1 | 8/2010 | Monroe et al. |
| 2010/0226091 A1 | 9/2010 | Dunn |
| 2010/0231563 A1 | 9/2010 | Dunn et al. |
| 2010/0237697 A1 | 9/2010 | Dunn et al. |
| 2010/0238299 A1 | 9/2010 | Dunn et al. |
| 2010/0299556 A1 | 11/2010 | Taylor et al. |
| 2011/0019636 A1 | 1/2011 | Fukuoka et al. |
| 2011/0047567 A1 | 2/2011 | Zigmond et al. |
| 2011/0078536 A1 | 3/2011 | Han et al. |
| 2011/0283199 A1 | 11/2011 | Schuch et al. |
| 2012/0105424 A1 | 5/2012 | Lee et al. |
| 2012/0203872 A1 | 8/2012 | Luby et al. |
| 2012/0302343 A1 | 11/2012 | Hurst et al. |
| 2012/0308191 A1 | 12/2012 | Chung et al. |
| 2013/0162908 A1 | 6/2013 | Son et al. |
| 2013/0173358 A1 | 7/2013 | Pinkus |
| 2013/0282154 A1 | 10/2013 | Chappell et al. |
| 2014/0002747 A1 | 1/2014 | Macholz |
| 2014/0230526 A1 | 8/2014 | Willemin et al. |
| 2015/0193074 A1 | 7/2015 | Cudak et al. |
| 2015/0250021 A1 | 9/2015 | Stice et al. |
| 2016/0034240 A1 | 2/2016 | Kreiner et al. |
| 2016/0125772 A1* | 5/2016 | Li .......................... G09F 13/18 40/544 |
| 2017/0075777 A1 | 3/2017 | Dunn et al. |
| 2017/0083043 A1 | 3/2017 | Bowers et al. |
| 2017/0163519 A1 | 6/2017 | Bowers et al. |
| 2017/0242502 A1 | 8/2017 | Gray et al. |
| 2017/0242534 A1 | 8/2017 | Gray |
| 2017/0256051 A1 | 9/2017 | Dwivedi et al. |
| 2017/0315886 A1 | 11/2017 | Helmick et al. |
| 2018/0027635 A1 | 1/2018 | Roquemore, III |
| 2018/0061297 A1 | 3/2018 | Schuch et al. |
| 2018/0128708 A1* | 5/2018 | Cirino ................ G01M 3/3272 |
| 2018/0181091 A1 | 6/2018 | Funk et al. |
| 2018/0268783 A1 | 9/2018 | Woo |
| 2018/0314103 A1 | 11/2018 | Dunn et al. |
| 2018/0364858 A1 | 12/2018 | Gray |
| 2018/0364859 A1 | 12/2018 | Gray |
| 2018/0364860 A1 | 12/2018 | Gray |
| 2018/0364861 A1 | 12/2018 | Gray |
| 2019/0087042 A1 | 3/2019 | Van Ostrand et al. |
| 2019/0171331 A1 | 6/2019 | Gray et al. |
| 2019/0258552 A1 | 8/2019 | Dunn et al. |
| 2020/0012383 A1 | 1/2020 | Wang et al. |
| 2020/0019363 A1 | 1/2020 | Newnham et al. |
| 2020/0272269 A1 | 8/2020 | Dunn |
| 2021/0117143 A1 | 4/2021 | Newnham et al. |
| 2021/0397292 A1 | 12/2021 | Dunn |
| 2022/0100452 A1 | 3/2022 | Newnham et al. |
| 2022/0260872 A1* | 8/2022 | Dunn ................ G02F 1/133308 |
| 2023/0160774 A1* | 5/2023 | Dunn ...................... G01M 3/26 73/40 |

FOREIGN PATENT DOCUMENTS

| | | | |
|---|---|---|---|
| CN | 217384567 U * | 9/2022 | ............ H01J 29/865 |
| EP | 0313331 B1 | 2/1994 | |
| EP | 1821538 A1 | 8/2007 | |
| EP | 2351369 A2 | 8/2011 | |
| EP | 2396964 A2 | 12/2011 | |
| EP | 3347793 A1 | 7/2018 | |
| JP | 61-234690 A | 10/1986 | |
| JP | 61-251901 A | 11/1986 | |
| JP | 7-74224 A | 3/1995 | |
| JP | 2000122575 A | 4/2000 | |
| JP | 3080628 B2 * | 8/2000 | ............ G09F 13/22 |
| JP | 2002064842 A | 2/2002 | |
| JP | 2002209230 A | 7/2002 | |
| JP | 2005-211449 A | 8/2005 | |
| JP | 2005-211451 A | 8/2005 | |
| JP | 2005236469 A | 9/2005 | |
| JP | 2005333568 A | 12/2005 | |
| JP | 4235429 B2 * | 3/2009 | ............ H01J 29/865 |
| JP | 2010282109 A | 12/2010 | |
| JP | 2018537876 A | 12/2018 | |
| JP | 6639653 B2 | 1/2020 | |
| KR | 200361111 Y1 * | 9/2004 | ............ G09F 13/22 |
| KR | 10-2010-0081354 A | 7/2010 | |
| KR | 10-2011-0065338 A | 6/2011 | |
| KR | 10-2056069 B1 | 12/2019 | |
| WO | WO9608892 A1 | 3/1996 | |
| WO | WO2008050402 A1 | 5/2008 | |
| WO | WO2011106683 A2 | 9/2011 | |
| WO | WO2012/127971 A1 | 9/2012 | |

(56) References Cited

FOREIGN PATENT DOCUMENTS

| WO | 2013/182733 A1 | 12/2013 |
| WO | WO2017044952 A1 | 3/2017 |
| WO | WO2020/176416 A1 | 9/2020 |

OTHER PUBLICATIONS

Texas Advanced Optoelectronic Solutions Inc., TCS230 Programmable Color Light-To-Frequency Converter, Dec. 2007, 12 pages.

Methven, Don, Wireless Video Streaming: An Overview, Nov. 16, 2022, 7 pages.

OutdoorLink, Inc., SmartLink One, One Relay, http://smartlinkcontrol.com/billboard/one-relay/, retrieved Apr. 17, 2019, 2007-16, 6 pages.

OutdoorLink, Inc., SmartLink Website User Manual, http://smartlink.outdoorlinkinc.com/docs/SmartLinkWebsiteUserManual.pdf, 2017, 33 pages.

OutdoorLink, Inc., SmartLink One Out of Home Media Controller, 2016, 1 page.

Sigmasense, Analog can't touch Digital, https://sigmasense.com/, retrieved Jan. 23, 2019, 5 pages.

Sigmasense, Solutions, https://sigmasense.com/solutions/, retrieved Jan. 23, 2019, 4 pages.

Sigmasense, Technology, https://sigmasense.com/technology/, retrieved Jan. 23, 2019, 3 pages.

Turley, Jim, SigmaSence ICCI Goes Big, New Touch Technology Aimed at Big Screens, But That's Just for Starters, EEJournal, https://www.eejournal.com/article/sigmasense-icci-goes-big/, Jan. 8, 2019, 3 pages.

\* cited by examiner

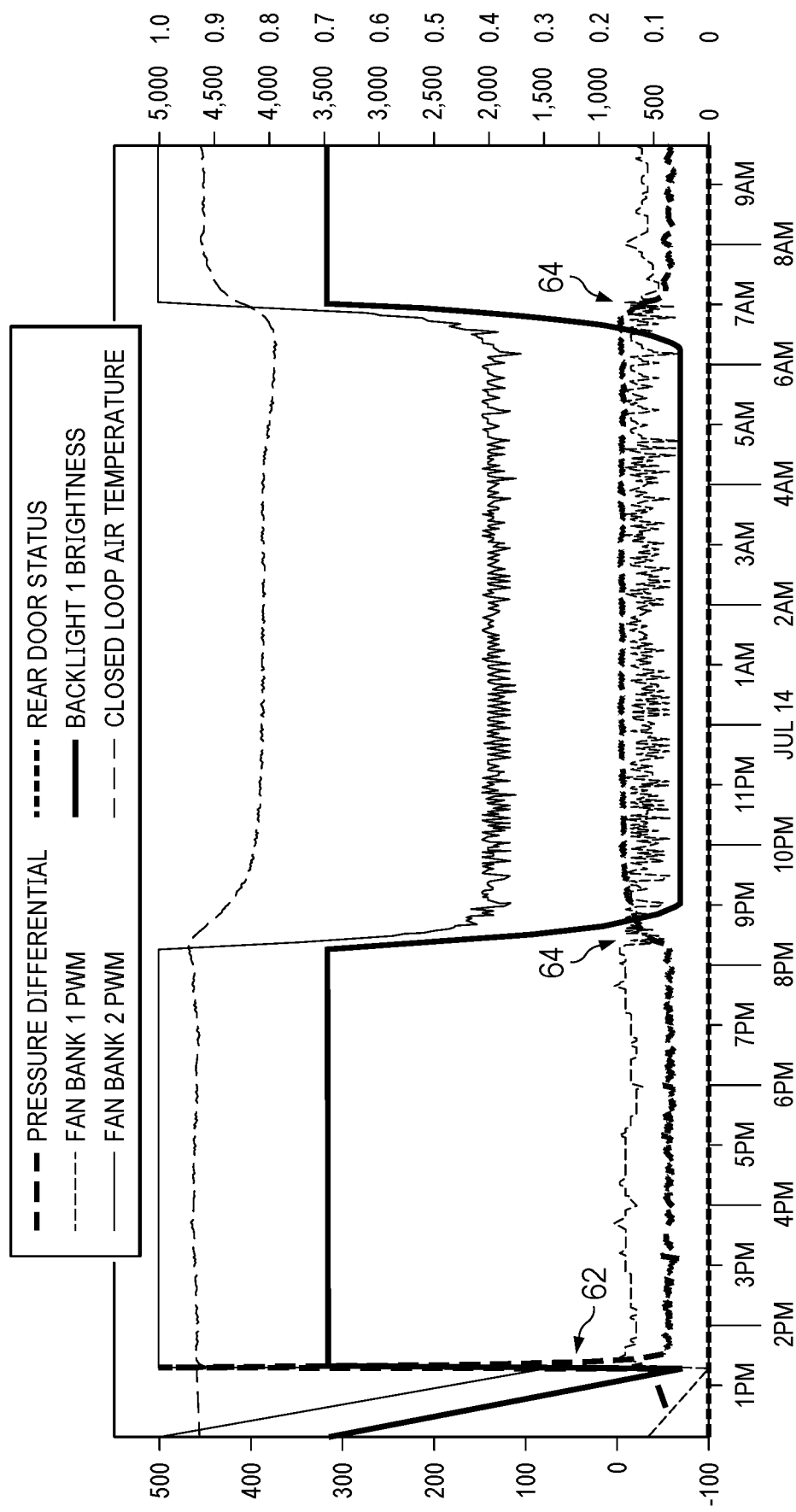

DISPLAY ASSEMBLIES WITH DIFFERENTIAL PRESSURE SENSORS

CROSS-REFERENCE TO RELATED APPLICATIONS

This application claims the benefit of U.S. provisional patent application Ser. No. 63/226,290 filed Jul. 28, 2021, U.S. provisional patent application Ser. No. 63/235,986 filed Aug. 23, 2021, and U.S. provisional patent application Ser. No. 63/240,246 filed Sep. 2, 2021, the disclosures of each of which are hereby incorporated by reference as if fully restated herein.

TECHNICAL FIELD

Exemplary embodiments relate generally to display assemblies with differential pressure sensors, including systems and methods for testing and operating the same.

BACKGROUND AND SUMMARY OF THE INVENTION

The use of electronic displays, such as for advertising, in the out-of-home market has increased in popularity over recent years. Being located outdoors, such electronic displays are frequently exposed to harsh conditions, including, but not limited to, solar loading, extreme temperatures, precipitation, moisture, contaminants, vandalism, wildlife, and the like. To protect the electronic displays, and associated sensitive components, from such harsh conditions, it is known to place the electronic displays in ruggedized housings. Such housings may fully or partially seal the electronic displays and associated sensitive components.

It is known to thermally manage such electronic display assemblies using ambient air and/or circulating gas. Such ambient air may pass through one or more open loop airflow pathways within the assembly, and may thermally interact with circulating gas in one or more closed loop airflow pathways within the assembly where such closed loop pathways are used to remove heat generated by the electronic display assemblies, such as at a backlight.

Such electronic display assemblies, particularly those which are fully or partially sealed, are sometimes tested for water ingress before sale or installation. It is known to test such electronic display assemblies by showering them with water for a period of time and checking for water intrusion at the fully or partially sealed areas. However, such water testing does not always provide a strong indication of actual leakage or sealing. For example, internal leak points may not always be exposed to such showering water, or may be so small that water cannot readily pass through the leak points. As another example, water may slide along an area that acts as flashing for a gap which is otherwise gas permeable. Therefore, what is needed is a more reliable form of testing electronic display assemblies for leakage.

Systems and methods providing more reliable leak testing for electronic display assemblies (hereinafter also "units") are provided. In exemplary embodiments, one or more differential pressure sensors may be provided at such units to measure pressure differentials between circulating gas in closed loops or other fully or partially sealed areas (hereinafter also referred to as "testing area(s)") and ambient air. Certain components of the units may be manipulated to perform such testing and the differential pressure results may be analyzed to determine results. The results may indicate how well sealed the testing area is, the location of leak points, or the occurrence of certain operating conditions, to name a few examples without limitation.

For example, without limitation, one or more access panels into one or more testing areas may be closed. This may result in an increase in positive pressure within the associated testing area(s). Because it is generally impossible or impractical to provide a 100% gas impermeable seal between testing areas and the ambient environment, the positive pressure is expected to leak down to equilibrium over time. The time it takes for the testing area to leak down to equilibrium with the ambient air may indicate how well sealed the testing area is. It may be desirable to provide a particular level of seal as indicated by a target minimum leak down time under such conditions.

In other exemplary embodiments, the speed of fans in, or in fluid communication with, the testing areas or open loop airflow pathways may be changed to effectuate testing conditions. For example, without limitation, the fans associated with ambient air may be operated at a relatively high output (e.g., operated at 100% speed) while fans associated with the testing area may be operated at a relatively low output (e.g., operated at 0% speed). A change in differential pressure under such conditions may indicate leakage between the testing area and ambient environment. As another example, without limitation, the fans associated with the testing area may be at a relatively high output (e.g., operated at 100% speed) while fans associated with the ambient air and/or open loop(s) may be operated at a relatively low output (e.g., operated at 0% speed). Differential pressure readings may be taken on either side of the fans associated with the testing area. Where the pressure change on one side of such fans is larger (by a positive or negative amount), this may indicate that the leak is on the opposing side of the fan.

Differential pressure of operational units may be monitored. The results of such monitoring may be indicative of certain conditions the electronic display assemblies are experiencing. For example, without limitation, where the fans associated with ambient air are operated at a relatively high output (e.g., operated at 100% speed) and the fans associated with the testing area(s) are operated at a relatively low output (e.g., operated at 0% speed), and the pressure difference on one or more sides of the fans associated with the testing area significantly changes and remains changed for more than a certain period of time, this may indicate that an access panel to the testing area is open. If the pressure difference on one or more sides of the fans associated with the testing area significantly changes for a relatively short period of time, that may indicate a mechanical input (e.g., vandalism, shaking, or the like of the electronic display assemblies). If the pressure difference on one or more sides of the fans associated with the testing area significantly changes on a sporadic basis, this may indicate the presence of a wind storm.

Where such events are experienced, alerts may be generated based on various thresholds. The alerts may be electronically transmitted over one or more networks to one or more remote electronic devices, such as associated with remote operations centers, owners, operators, or other interested parties. Alternatively, or additionally, the alerts may be displayed on electronic displays of the units themselves.

Such testing and monitoring may be performed before a unit is installed. Alternatively, or additionally, such testing and monitoring may be performed for installed units.

Any number, type, or kind of such differential pressure sensors may be utilized in such electronic display assemblies in any number of locations within or otherwise at such electronic display assemblies. Furthermore, while differential pressure sensors are discussed, two separate pressure sensors may be utilized (e.g., at least one within or in fluid communication with each testing area) and at least one other one within or in fluid communication with the ambient environment, and the results may be electronically compared to arrive at differential pressure readings.

In exemplary embodiments, a first set of one or more fans may be associated with a first electronic display subassembly and a second set of one or more fans may be associated with a second electronic display subassembly. In this manner, at least some circulating gas within a rear chamber may travel in opposite directions. At least some of the circulating gas may recirculate within a given one of the first and second electronic display subassemblies. At least some of the circulating gas may cross over between the first and second electronic display subassemblies. This may create a generally turbulent flow within the rear chamber. Each of the sets of fans may be operated and/or controlled together or separately.

Testing procedures may be utilized to identify a location of a leak, such as between the first and second electronic display subassemblies. Initial testing may be performed to establish baseline differential pressures for a display assembly under various operating conditions. Initial testing may be performed by turning off all open loop fans and operating all closed loop fans. If a tested differential pressure is outside a normal range for the display assembly on the low side, a leak may be determined in a lower pressure side of the display assembly (e.g., the negative pressure side). If differential pressure is outside a normal range of a display assembly on the high side, a leak may be determined in a high pressure side of the display assembly (e.g., the positive pressure side).

The second set of one or more fans associated with the second electronic display subassembly (sometimes also referred to as the secondary subassembly) may be turned off while the first set of one or more fans associated with the first electronic display subassembly (sometimes also referred to as the primary subassembly) may be turned, or remain, on. If the pressure differential is higher than normal, or within a normal range, no leak may be indicated in the primary side. If the pressure differential is lower than normal, a leak in the primary side may be indicated.

The first set of one or more fans may be subsequently turned off while the second set of one or more fans may be turned on. If the pressure differential is higher than normal, or within a normal range, no leak may be noted in the secondary side. If the pressure differential is lower than normal, a leak in the secondary side may be indicated. In this manner, the location of the leak may be further identified.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 14 illustrates an exemplary data chart for the electronic display assembly of FIG. 1 undergoing certain testing;

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
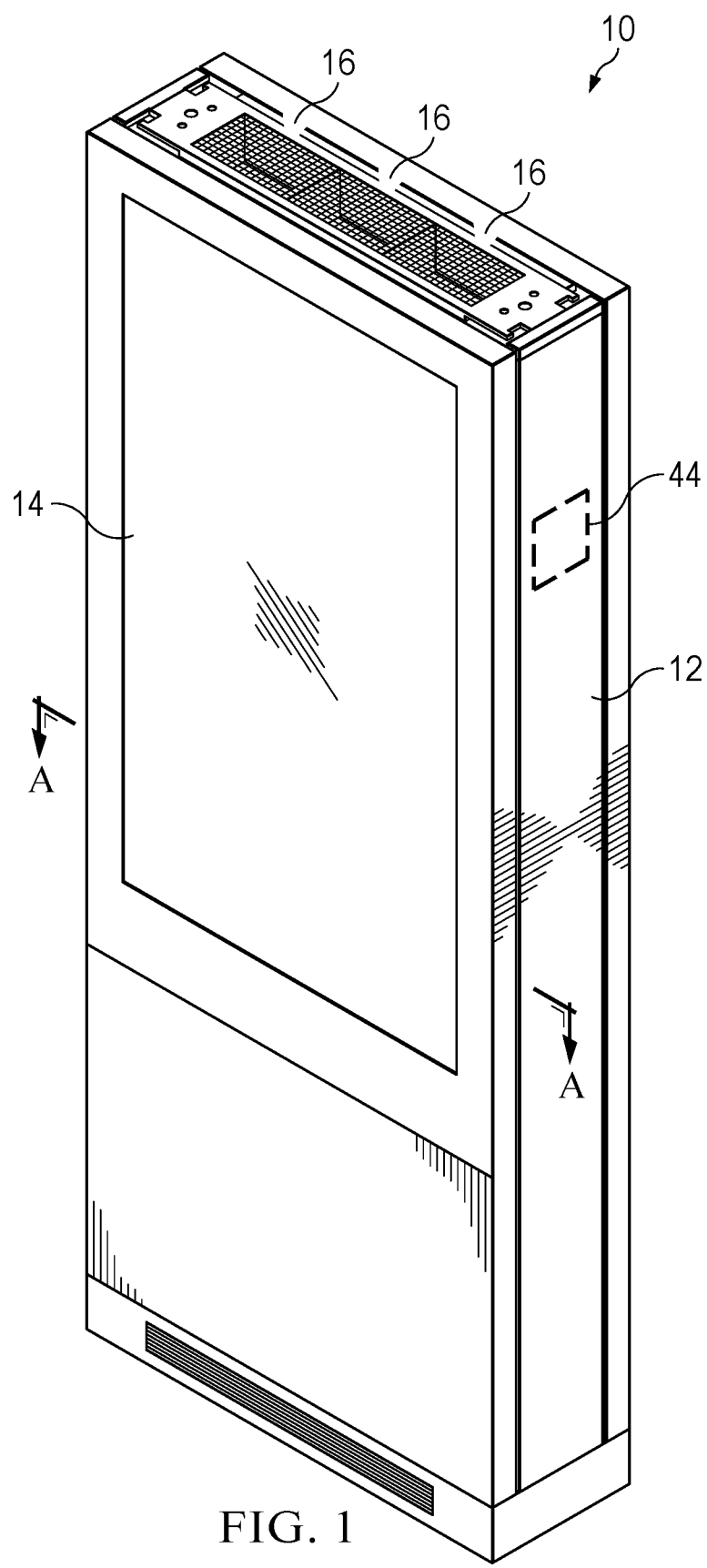
FIG. 1 is a perspective view of an exemplary electronic display assembly in accordance with the present invention also illustrating section line A-A.

FIG. 1 is a perspective view of an exemplary electronic display assembly (hereinafter also a "unit") 10 in accordance with the present invention. The unit 10 may include a structural framework 12. The structural framework 12 may be configured for mounting to a ground surface, such as a sidewalk or street, mounting to a wall or other surface, incorporation into street furniture (e.g., phone booths, bus shelters, benches, railings, combinations thereof, or the like), combinations thereof, or the like. The structural framework 12 may comprise one or more members, panels, cladding, combinations thereof, or the like.

The units 10 may comprise one or more electronic display subassemblies 14. Some or all of the electronic display subassemblies 14 may be attached to the structural framework 12 in a moveable manner, though such is not required. For example, the electronic display subassemblies 14 may be attached to the structural framework in a hinged manner to permit selective movement between a closed position whereby certain parts of the units 10 are fully or partially sealed, and an open position whereby certain parts of the interior of the unit 10 are exposed for access. Fully or partially sealing may be provided in accordance with one or more standards, such as, but not limited to, ingress protection (IP) ratings provided by the International Electrotechnical Commission (e.g., available at https://www.iec.ch/ip-ratings), such as, but not limited to, IP 63, 64, 65, 66, 67, and/or 68 by way of non-limiting example.

One or more intakes and exhausts 16 may be provided at the units 10 for ingesting and exhausting ambient air.

Figure 2:
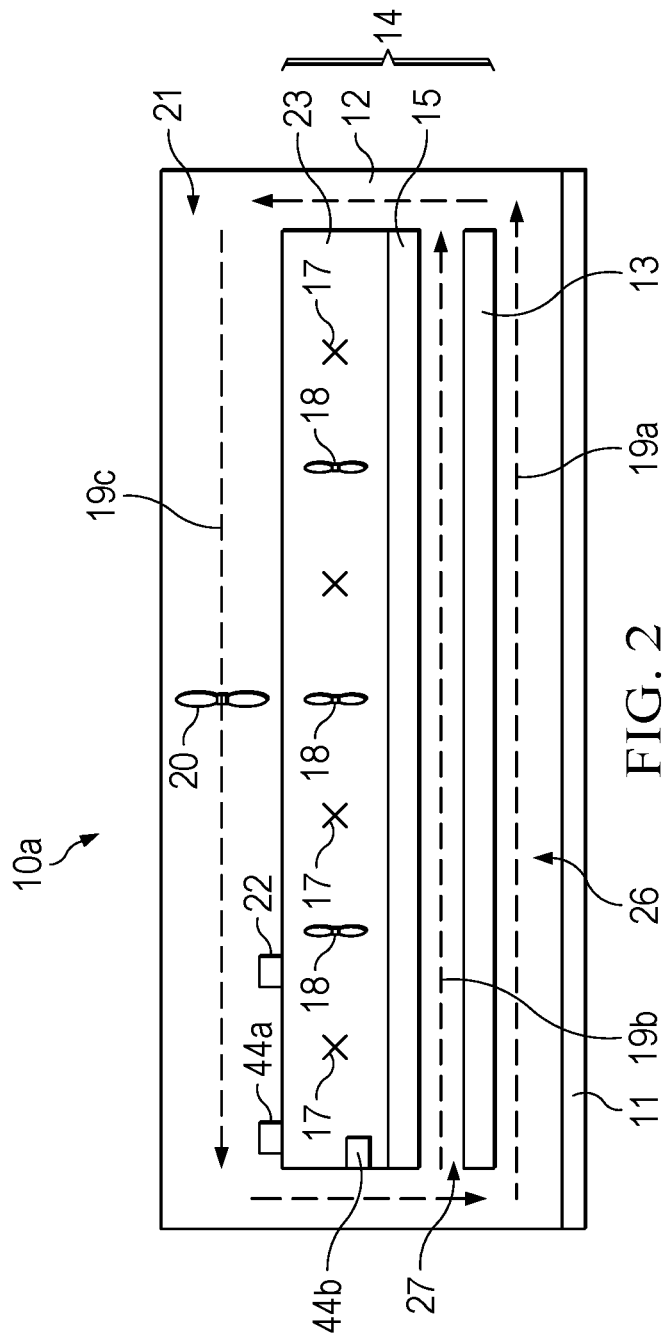
FIG. 2 is a simplified sectional view of an exemplary embodiment of the electronic display assembly of FIG. 1 taken along section line A-A.
Figure 3:
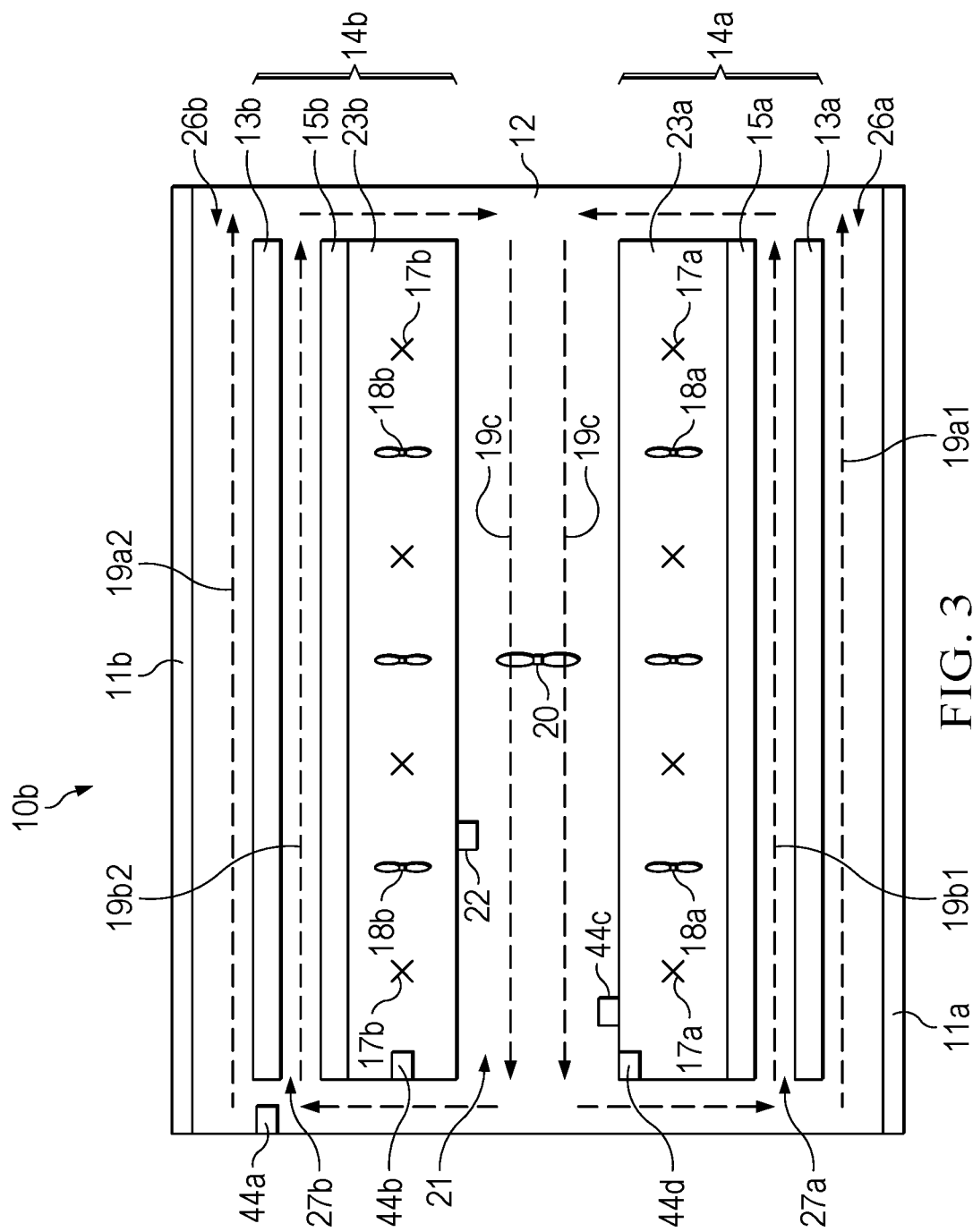
FIG. 3 is a simplified sectional view of another exemplary embodiment of the electronic display assembly of FIG. 1 taken along section line A-A.
Figure 4:
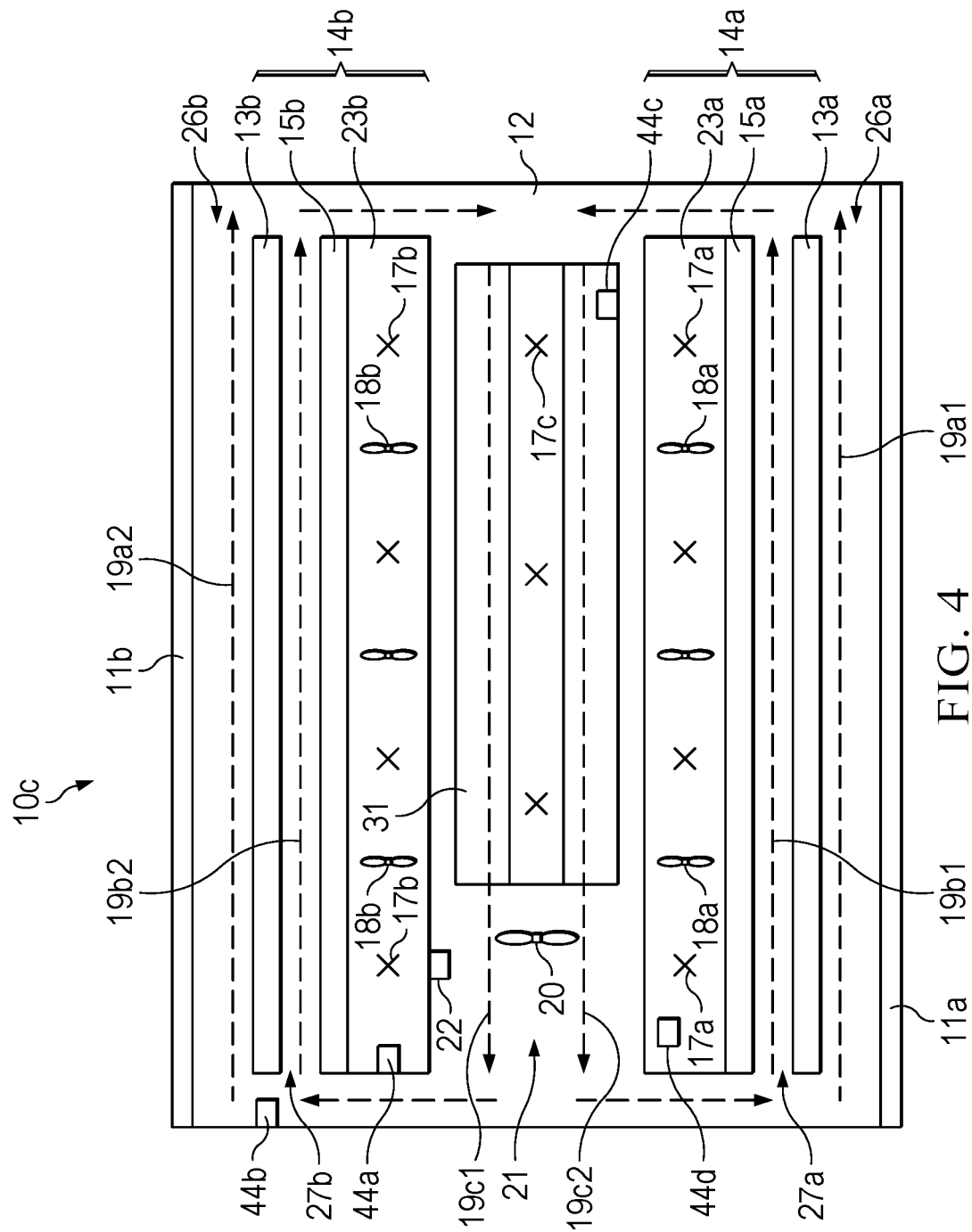
FIG. 4 is a simplified sectional view of another exemplary embodiment of the electronic display assembly of FIG. 1 taken along section line A-A.

FIG. 2 through FIG. 4 illustrate various exemplary embodiments of airflow pathways within the units 10. FIG. 2 illustrates an exemplary unit 10a with a single electronic display subassembly 14. FIGS. 3 and 4 illustrate exemplary units 10b, 10c with two electronic display subassemblies 14a, 14b placed in a back-to-back arrangement. Any number of electronic display subassemblies 14 may be utilized in any arrangement with the structural framework 12. Similar or the same components used in conjunction with units 10 having multiple electronic display subassemblies 14 may use the same numbering with the addition of an "a", "b", "c", and/or "1", "2", etc. (e.g., 14 to 14a, 14b, 30a to 30a1, 30a2).

Each electronic display subassembly 14 may comprise an illumination device 15. In exemplary embodiments, the illumination device 15 may comprise a number of lighting elements, such as LEDs, provided at a substrate. In exemplary embodiments, the illumination device 15 may be provided rearward of the electronic display layer 13 to serve as a direct backlight. In other exemplary embodiments, the illumination device 15 may comprise one or more diffusive and/or transmissive layers and the substrate and/or lighting elements may be positioned about the edge of the electronic display layer 13 to provide edge lighting to the same. In certain exemplary embodiments, such as where the electronic display layer 13 is an LED, OLED, or other type of self-illuminating display, the illumination device 15 may not be required.

The electronic display layer 13 and/or illumination device 15 may be positioned rearward of a cover 11. The cover 11 may comprise one or more layers of a transparent or translucent material. In exemplary embodiments, each cover 11 may comprise two layers bonded with an optically clear adhesive. One or more polarizers, anti-reflective materials, combinations thereof, or the like may be disposed on some or all of the cover 11. The cover 11 may form part of the electronic display subassembly 14 or may be separate therefrom. The cover 11 and the structural framework 12 may together substantially enclose the units 10, such as with intakes/exhausts 16 exempted. The cover 11 may be configured to move with the electronic display subassembly 14, may be configured for independent movement, and/or may be fixed to the structural framework 12.

A single or multiple such electronic display subassemblies 14 may be provided at a single unit 10, such as, but not limited to, in a back-to-back arrangement. The electronic display subassemblies 14 may be of the same or different type and may comprise the same or different components. The electronic display subassemblies 14 may be provided in any arrangement such as portrait or landscape.

The intakes and/or exhausts 16 may be fluidly connected to one or more open loop airflow pathways 23 within the units 10. One or more filters may be provided at the intakes and/or exhausts 16 and/or along the one or more open loop airflow pathways 23 within the units 10, though such is not necessarily required.

A respective one of the open loop airflow pathways 23a, 23b may extend through a respective one of the electronic display subassemblies 14a, 14b in exemplary embodiments such that an open loop airflow pathway 34 is provided for each one of the electronic display subassemblies 14, which may be entirely separate or separated for a distance and rejoined. For example, without limitation, the open loop airflow pathways 23 may extend behind and along at least a portion of the illumination device 15 for the electronic display layer 13 and/or behind and along at least a portion of the electronic display layers 13 itself, such as in the case of LED, OLED, or other self-illuminating displays. However, any type, arrangement, and/or number of airflow pathway(s) may be utilized. The open loop airflow pathways 23 may comprise one or more corrugated layers in exemplary embodiments.

One or more closed loop airflow pathways may be provided within the units 10. In exemplary embodiments, such closed loop airflow pathways may comprise at least a front chamber 26, which may extend extending between the cover 11 and the electronic display layer 13 as well as a rear chamber 21, which may extend extending behind the electronic display subassembly 14, or at least the electronic display layer 13, but within the structural framework 12. However, any type, arrangement, and/or number of airflow pathway(s) may be utilized. One or more filters may be provided at or along the one or more closed loop airflow pathways within the units 10, though such is not necessarily required. Filters, barriers, walls, gaskets, combinations thereof, or the like may provide separation between open and closed loop airflow pathways.

Where multiple electronic display subassemblies 14a, 14b are utilized, the rear chamber 21 may be common to each of the electronic display subassemblies 14a, 14b. A heat exchanger 31 may be located within the rear chamber 21, though such is not required. The heat exchanger 42 may comprise a multilayer heat exchanger configured to accommodate a common flow 30c of the circulating gas through at least some of the layers as well as one or more flows 32c of ambient air through at least some other ones of the layers 34c.

An illumination device chamber 27 may extend between each of the electronic display layers 13a, 13b and the respective illumination devices 15a, 15b. A flow of circulating gas 19c within the rear chamber 21 may be separated such that a first portion 19a flows through the front chamber 26 and a second portion 19b flows through the illumination device chamber 27. The flows 19a, 19b may be recombined, such as in the rear chamber 21.

One or more open loop fans 18 may be provided. The same of different open loop fans 18 may be associated with each of the open loop airflow pathways 23. The open loop fans 18 may be configured to ingest ambient air 17 into the units 10, exhaust ambient air 17 from the assembly 10, and/or move ingested ambient air 17 through the one or more open loop airflow pathways 23 when activated. One or more closed loop fans 20 may be provided. The same of different closed loop fans 20 may be associated with each of the closed loop airflow pathways. The closed loop fans 13 may be configured to move circulating gas through said one or more closed loop airflow pathways when activated. The fans 20, 18 may be axial fans, centrifugal fans, combinations thereof, or the like. Any number or type of fans 20, 18 may be used at any location in the units 10, and may be provided in banks or sets. The open loop airflow pathways 23 may be separate from the closed loop airflow pathways, though a complete (e.g., gas impermeable) separation is not necessarily required.

Examples of such airflow configurations and/or operations may include, for example, without limitation, those shown and/or described in one or more of U.S. Pat. No. 8,854,595 issued Oct. 7, 2014, U.S. Pat. No. 8,767,165 issued Jul. 1, 2014, U.S. Pat. No. 8,654,302 issued Feb. 18, 2014, U.S. Pat. No. 8,351,014 issued Jan. 8, 2013, U.S. Pat. No. 10,660,245 issued May 19, 2020, U.S. Pat. No. 10,194,564 issued Jan. 29, 2019, and/or U.S. Pat. No. 10,398,066 issued Aug. 27, 2019, the disclosures of each of which are hereby incorporated by reference in their entireties. The structure and/or mechanical operation of the units 10, and the various components thereof, and/or airflow configurations may include those shown and/or described in U.S. Pat. No. 10,485,113 issued Nov. 19, 2019 (the "'133 Patent"), the disclosures of which are hereby incorporated by reference in their entirety. Movement and/or structure for facilitating movement of the electronic display subassemblies 14 may be as shown and/or described in at least the '133 Patent.

The unit 10 may comprise one or more controller(s) 22. The controller(s) 22 may comprise one or more programmable logic devices. The unit 10 may comprise one or more sensors 44. The sensors 44 may comprise, for example, without limitation, temperature sensors, fan speed sensors, airflow sensors, humidity sensors, relative humidity sensors, air pressure sensors 25, differential pressure sensors 24, location sensors, moisture sensors, combinations thereof, or the like. Any type, kind, or number of sensors 44 may be utilized at any number of locations within the units 10. The sensor(s) 44 may be in electronic communication with the controller(s) 22.

Figure 5:
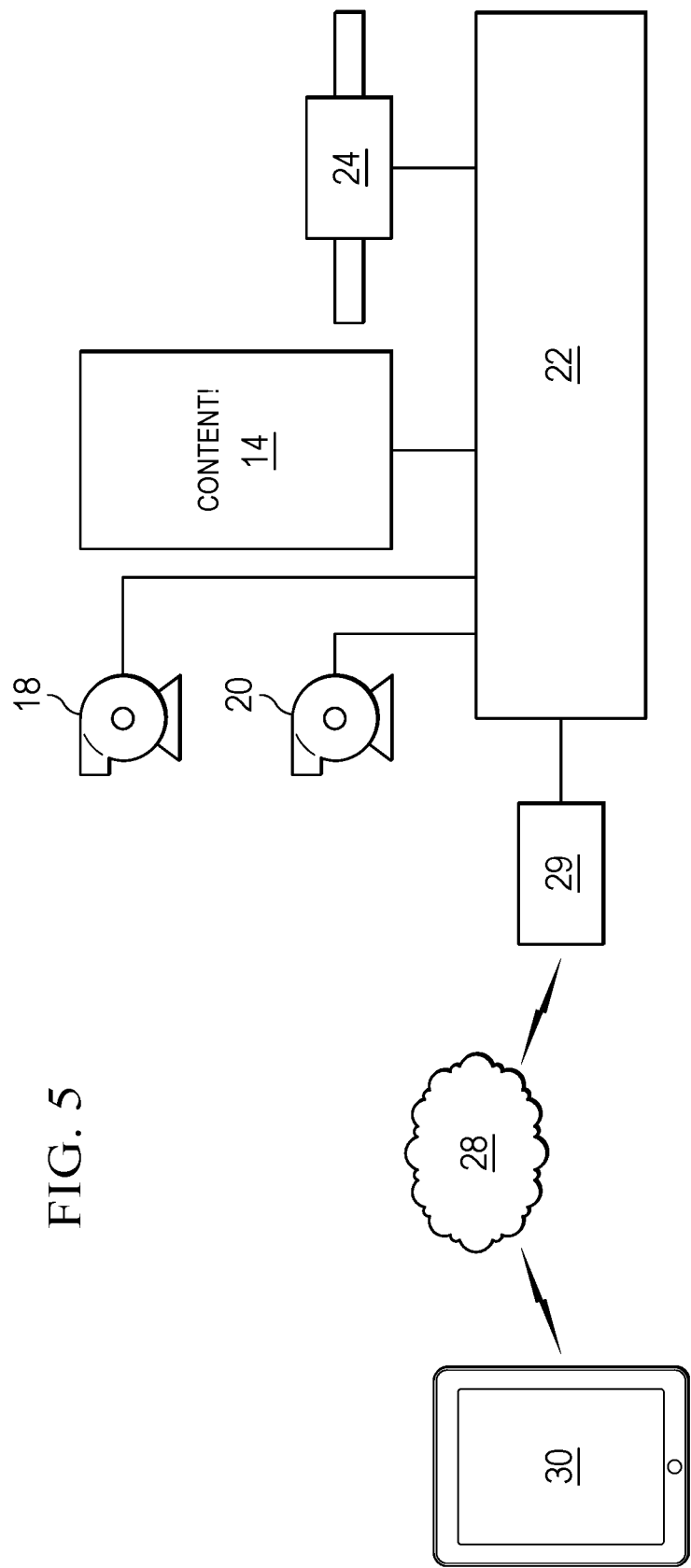
FIG. 5 is a simplified exemplary electrical schematic for the electronic display assembly of FIG. 1.

FIG. 5 is a simplified exemplary electrical schematic for the electronic display assembly 10. A controller 22 may be electrically connected to each of the electronic display subassemblies 14. The controller 22 may be electrically connected to one or more open loop fans 18 associated with one or more open loop airflow pathways. The open loop fans 18 may be configured to ingest ambient air into the units 10, exhaust ambient air from the assembly, and/or move ingested ambient air through the one or more open loop airflow pathways when activated. The controller 22 may be electrically connected to one or more closed loop fans 20 associated with the one or more closed loop airflow pathways. The open loop airflow pathways may be separate from the closed loop airflow pathways, though a complete (e.g., gas impermeable) separation is not required.

The controller 22 may be electrically connected to one or more differential pressure sensors 24. Each of the differential pressure sensors 24 may be in fluid communication with at least one of the one or more open loop airflow pathways and/or the ambient environment. The measured pressure of the ambient environment may be referred to as gauge pressure in some cases. Each of the differential pressure sensors 24 may also be in fluid communication with at least one of, or at least one portion of, the one or more closed loop airflow pathways. Each of the differential pressure sensors 24 may be configured to periodically take samples of at least a portion of air pressure of the ambient air and of the circulating gas, such as is shown and/or described with respect to FIG. 7, to determine a pressure differential between the measured ambient air and circulating gas. Where more than one closed loop airflow pathway is utilized, a differential pressure sensor 24 may be provided for each closed loop airflow pathway. Alternatively, or additionally, multiple differential pressure sensors 24 may be used in association with each of said one or more closed loop airflow pathways.

The differential pressure sensors 24 may include those available from The Sensirion Company of Staefa ZH, Switzerland, such as, but not limited to, the SDP800 series. Available at: https://www.sensirion.com/en/flow-sensors/differential-pressure-sensors/sdp800-proven-and-improved/. However, in exemplary embodiments, the ports for the differential pressure sensors 24 may extend at 90 degrees (e.g., in an elbow arrangement) and may not be a flow-through type which may be susceptible to clogging over time and/or sensitive to tube length. Other exemplary differential pressure sensors 24 may include those available from First Sensor AG of Berlin, Germany (https://www.first-sensor.com/en/) and/or Amphenol of Wallingford, CT (https://www.amphenol.com/). These are merely exemplary and are not intended to be limiting. Any type or kind of differential pressure sensor 24 may be utilized. Multiple such differential pressure sensors 24 of the same or different type may be used in a single one of, or in different ones of, the units 10.

In exemplary embodiments, without limitation, the controller 22 may comprise an EPROM board, which may be regularly replaced with maintenance of the units 10. In exemplary embodiments, without limitation, at least a portion of the differential pressure sensors 24 may be provided at, or be integrated with, the controller 22. A first set of tubes or other fluid passageways may fluidly connect a first portion of each of the differential pressure sensors 24 to a respective one of the testing areas. A second set of tubes or other fluid passageways may fluidly connect a second portion of each of the differential pressure sensors 24 to one of the open loop airflow pathways and/or the ambient environment. In exemplary embodiments, without limitation, the second set of tubes or other fluid passageways, and/or the differential pressure sensor 24 itself, may be connected to, or provided on, a bottom portion or surface of the unit 10 so as to avoid water or other precipitation. Any number of tubes of any size, shape, length, or type may be provided to place the differential pressure sensors 24 in fluid communication with any number of areas inside or outside of the units 10. In this manner, multiple areas may be tested at the same or different times. Furthermore, this may permit placement of the differential pressure sensors 24 in a convenient location, such as, but not limited to, in the rear chamber 21 and/or part of a larger electronic board to keep it cooled, powered, and/or protected.

Data from the differential pressure sensors 24 may be sent to the controller 22. The controller 22 may be configured to command the differential pressure sensors 24 to take readings periodically, continuously, sporadically, at intervals, on-demand, combinations thereof, or the like. Alternatively, or additionally, the differential pressure sensors 24 may be configured to take such measurements periodically, continuously, sporadically, at intervals, on-demand, combinations thereof, or the like automatically.

The controller 22 may be electrically connected to a network communication device 29. The network communication device 29 may be configured to receive data from the controller 22 for transmission over one or more networks 28 to one or more electronic devices 30. The network 28 may comprise cellular networks, wireless networks, wired networks, combinations thereof, or the like. The electronic devices 30 may comprise personal computers, smartphones, tablets, network operation centers, combinations thereof, or the like. Multiple such differential pressure sensors 24 may be utilized and the results may be averaged or otherwise combined or compared.

Figure 6:
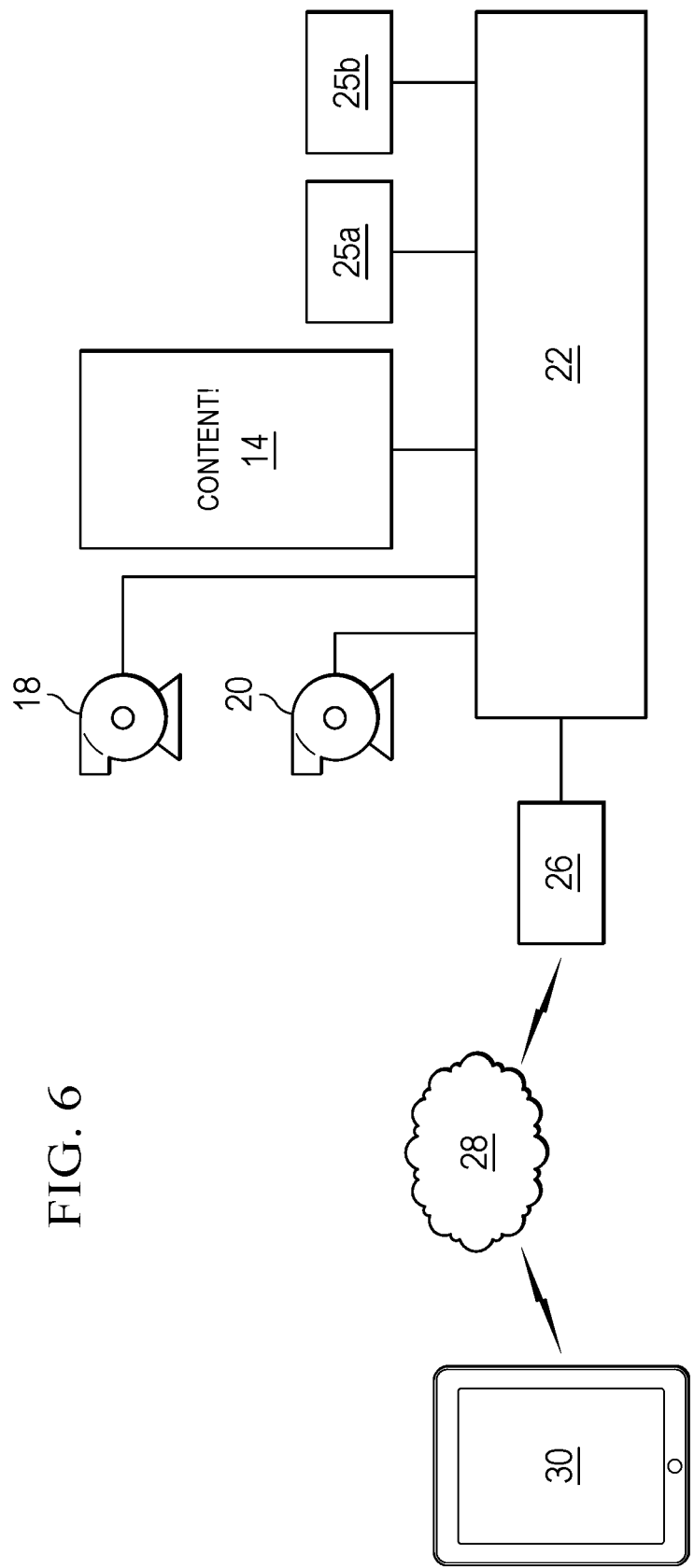
FIG. 6 is another simplified exemplary electrical schematic for the electronic display assembly of FIG. 1.

FIG. 6 is another simplified exemplary electrical schematic for the unit. Two separate pressure sensors 25a, 25b, may be utilized, one in association with the circulating gas and one in association with the ambient air, and their data sent to the controller 22 to create a differential pressure reading. A number of such sets of pressure sensors 25a, 25b may be utilized, one of which may be positioned to take a pressure reading of circulating gas, and one of which may be positioned to take a pressure reading of ambient air. Multiple such sensors 25a, 25b may be utilized and the results may be averaged or otherwise combined or compared.

Figure 7:
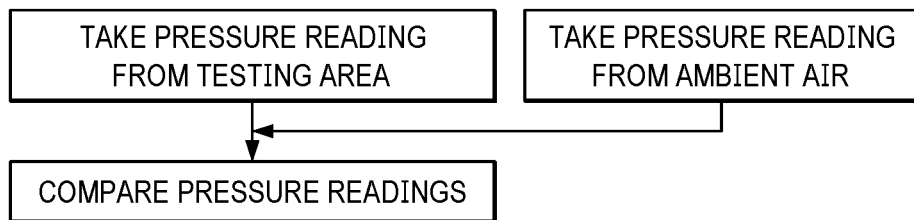
FIG. 7 is a flow chart with exemplary logic for taking differential pressure readings for use with the electronic display assembly of FIG. 1.

FIG. 7 illustrates logic which may be undertaken by the differential pressure sensors 24 and/or the controller 22 to create a differential pressure reading. The differential pressure sensors 24 may be configured to take pressure readings of the circulating gas and the ambient air at the same or different times. Regardless, corresponding measurements of the circulating gas and the ambient air may be compared, such as by subtraction for example, without limitation, to arrive at a differential pressure reading. In the case of pressure sensors 25, the controller 22 may determine the differential pressure based on readings from each of the sensors 25a, 25b. In the case of differential pressure sensors 24, the differential pressure sensors 24 and/or the controller 22 may be configured to determine the differential pressure readings.

In exemplary embodiments, the testing area may include the front chamber 26 and the illumination device chamber 27 such that a differential pressure may be taken between the front chamber 26 and the illumination device chamber 27. Such differential pressure readings may be determined by way of one or more differential pressure sensors 24 and/or multiple sensors 25. This may be used to, for example, without limitation, validate computer models regarding differential pressures between the front chamber 26 and the illumination device chamber 27, field testing, during operation, combinations hereof, or the like. Maintaining this differential pressure may be important for maintaining the position of the electronic display layer 13, such as to prevent or reduce bowing of the same.

Figure 8A:
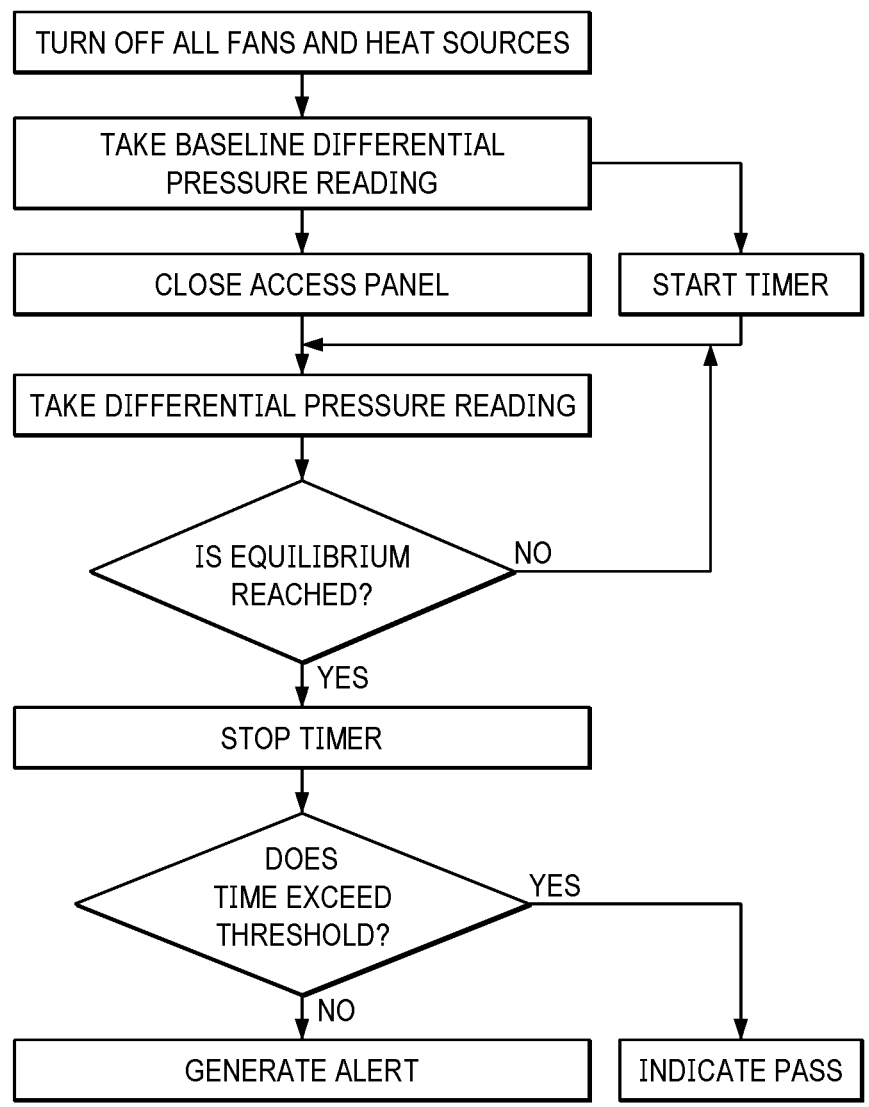
FIG. 8A is a flow chart with exemplary logic for performing a leak down test of the electronic display assembly of FIG. 1.
Figure 8B:
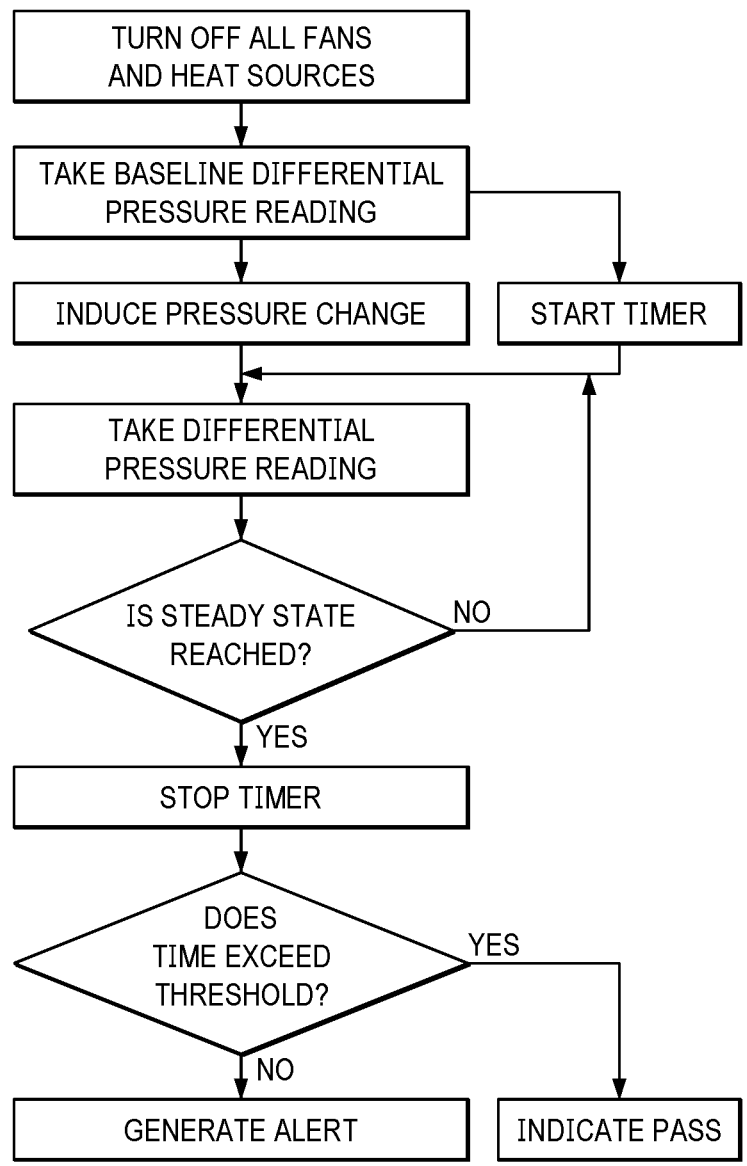
FIG. 8B is a flow chart with other exemplary logic for performing a leak down test of the electronic display assembly of FIG. 1.

FIG. 8A and FIG. 8B are flow charts with exemplary logic for performing leak down testing of the electronic display assembly 10. The fans 18, 20 may be deactivated (e.g., operated at 0% speed) and/or operated at minimal levels (e.g., less than 5%, between 0-10%). Such conditions may be commanded by the controller 22. A first differential pressure reading may be taken by the differential pressure sensors 24 and/or pressure sensors 25.

As shown with particular regard to FIG. 8A, an access panel to a fully or partially sealed portion of a closed loop airflow pathway with the unit 10 being tested (i.e., the testing area) may be moved from an opened position to a closed position to fully or partially seal the closed loop airflow pathway. Closing the access panel may create a positive or increased pressure within the testing area relative to ambient air, such as, but not limited to, in the range of 100-200 Pa. A timer may be started while, just before, or just after, the access panel is closed.

As shown with particular regard to FIG. 8B, pressure changes may be otherwise induced at the unit 10 being tested. In exemplary embodiments, a positive or negative pressure may be induced. Such pressure changes may be induced by fluidly connecting, and operating, one or more pressure inducing devices, such as, but not limited to, pumps, vacuums, valves, combinations thereof, or the like, to the closed loop airflow pathways of the unit 10. Alternatively, or additionally, the one or more pressure inducing devices may be fluidly connected to the open loop airflow pathways, which may be temporarily sealed to induce the pressure change. In exemplary embodiments, without limitation, a negative pressure may be induced by providing a vacuum by way of the one or more pressure inducing devices. Examples of the pressure inducing devices include, but are not limited to, the F600 leak tester from ATEQ of Les Clayes-sous-Bois, France (https://www.ateq-leaktesting-.com/products/leak-tester/f600/). The pressure change may be induced and controlled until a steady state desired pressure differential is created, which may comprise a target number (with or without a margin) or range. Steady state may include equilibrium and/or within a margin thereof.

Inducing pressure differentials by closing the access panel of the unit 10, such as shown and/or described with respect to FIG. 8A may be particularly useful for field testing of already installed units. For example, this may permit testing without the need to bring, attach, operate, etc. a pressure inducing device. Inducing pressure differentials by a pressure inducing device, such as shown and/or described with respect to FIG. 8B, may be particularly useful for pre-installation testing of a manufactured unit. For example, this may provide more consistent and accurate testing. However, either procedure may be used with installed or uninstalled units 10 and/or in combination with each other.

Regardless, differential pressure readings may be taken, continuously, periodically, at intervals, sporadically, combinations thereof, or the like, until an equilibrium, or within a predetermined range of an equilibrium (e.g., within 10 Pa), between the testing area and ambient pressure is reached. When such equilibrium, or within the predetermined range of an equilibrium, is reached, the timer may be stopped.

As shown with particular regard to FIG. 8B, alternatively or additionally, the differential pressure readings may be taken across a range and/or until a target is reached. For example, without limitation, the range may be from an induced pressure spike of 175-290 Pa, or a target within or about such a range, such as, but not limited to, 175, 250 or 290 Pa, and may be monitored until reaching 175-125 Pa, or a target within or about such a range. Any range, ranges, and/or thresholds may be used for the induced pressure spike and/or the leakdown target. Such ranges and/or thresholds may be relative to the peak pressure induced and/or the leakdown target. Pre-installation testing may be performed along these lines to establish benchmark leak down times. Such benchmark data may be used and compared with field tests, for example, to establish pass/fail criteria. This may be particularly helpful because field testing by closing an access panel, such as shown and/or described with respect to FIG. 8A, may result in varying pressure spikes. The pass/fail criteria may be adjusted based on the pressure spike induced based on existing data or extrapolated from existing data.

Regardless, such sampling may be commanded by the controller 22. The controller 22 may comprise a timer or other timekeeping device for measuring the time. The time may be reported by itself as an indication of how well sealed the testing area is as a longer time may indicate a more fully sealed unit 10. Alternatively, or additionally, where the time fails to meet or exceed a predetermined threshold (e.g., 10 minutes), an alert regarding leakage may be generated. Alternatively, or additionally, where the time meets or exceeds the predetermined threshold, an indication that the unit 10 passes testing may be generated. Any amount of time may be used for the threshold, but may generally be on the order of several minutes. Multiple such thresholds may be provided to indicate various levels of sealed (e.g., well-sealed, mostly sealed, poorly sealed).

The alerts, reports, indications, notifications, combinations thereof, or the like shown and/or described herein, may be generated at the controller 22 and reported to the one or more electronic devices 30 by way of the one or more networks 28. For example, without limitation, such alerts, reports, indications, notifications, combinations thereof, or the like may be accessible through a web-based interface, application, combinations thereof, or the like. Alternatively, or additionally, the controller 22 may be configured to display such alerts, reports, indications, notifications, combinations thereof, or the like at one or more of the electronic display subassemblies 14. For example, without limitation, the controller 22 may command the electronic display subassemblies 14 to display a message such as "Hey service tech, I'm leaking", for example, without limitation, or similar variations thereof may upon determination that the amount of time of a leak down test performed fails to meet or exceed the predetermined threshold.

Such leak down testing may be performed for a number of testing areas within each unit 10. In exemplary embodiments, leak down testing may be performed periodically, on demand, sporadically, and/or every time one of the access panels is opened, such as determined by one or more sensors associated with each such access panel and connected to said controller 22. Instructions to perform such leak down testing may be received at the controller 22 from the one or more electronic devices 30.

In exemplary embodiments, without limitation, the access panel may be a front assembly comprising one of the electronic display subassemblies 14 which forms a door. Such exemplary embodiments may be shown and/or described in at least the '133 Patent, for example, without limitation.

Alternatively, or additionally, a rate of change in differential pressure may be calculated by the controller 22 and used as a measure of leakage severity. Alerts regarding the same may be so generated based on various thresholds.

Figure 9:
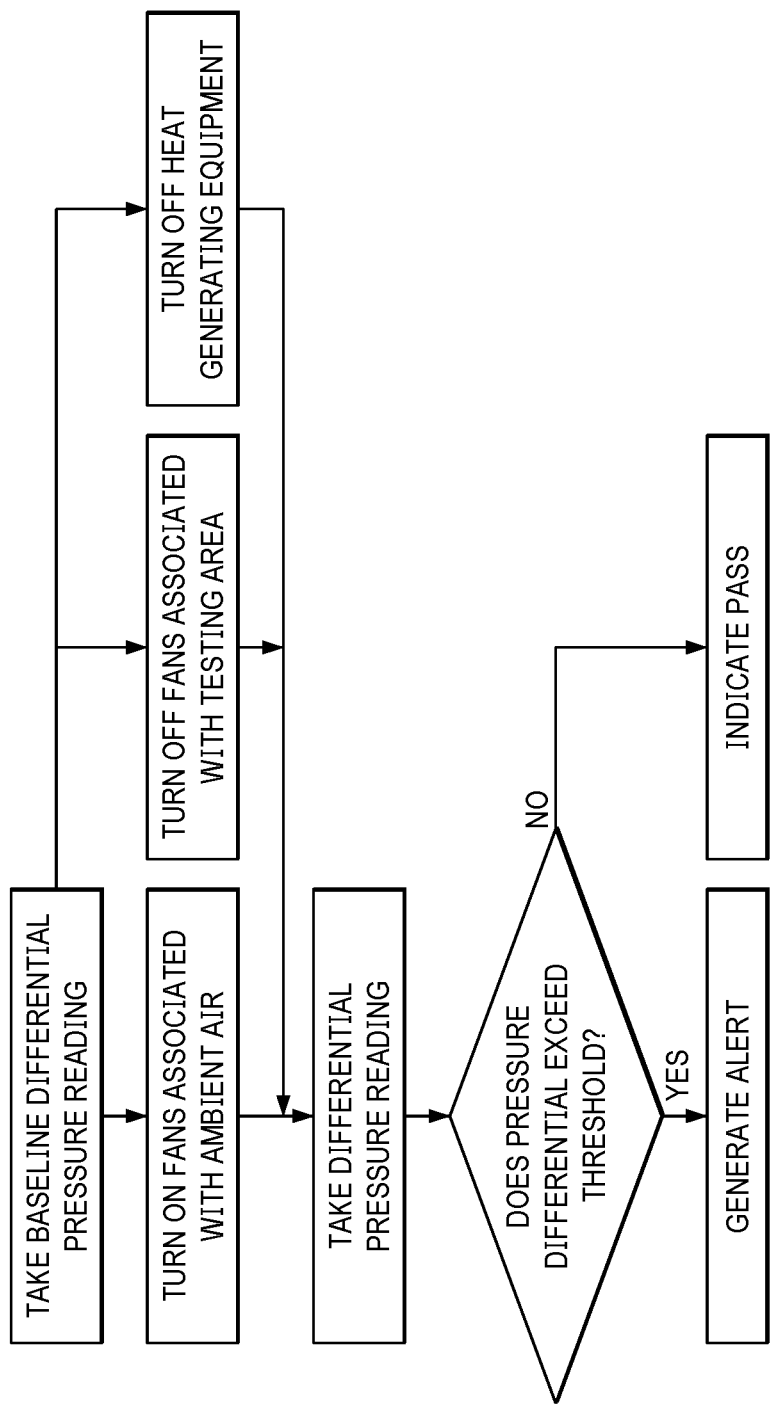
FIG. 9 is a flow chart with exemplary logic for performing a transference test for the electronic display assembly of FIG. 1.

FIG. 9 is a flow chart with exemplary logic for performing a transference test for the electronic display assembly 10. Optionally, a baseline or steady-state differential pressure reading may be taken based on normal operations of the unit 10. The closed loop fans 20 may be deactivated (e.g., operated at 0% speed, operated at less than 1% speed) and/or operated at minimal levels (e.g., less than 5%, less than 10%). The open loop fans 18 may be operated at maximum (e.g., operated at 100% speed) and/or high levels (e.g., above 95%, above 90%). Optionally, some or all heat generating equipment of the unit 10, such as, but not limited to, the electronic display subassembly 14 or components thereof (e.g., any backlight or other illumination elements), may be deactivated to prevent heat buildup while the closed loop fans 20 are deactivated or operated at minimal levels. Such conditions may be created by commands from the controller 22 in exemplary embodiments. A differential pressure reading may be taken. If the differential pressure reading falls outside a target (e.g., baseline or steady state) by a predetermined threshold, such as, but not limited to, 10 Pa, an alert may be generated. Commands for such measurements may be made by way of the controller 22. If the differential pressure reading meets or falls below the predetermined threshold, an indication of passing the test may be generated. This procedure may test for transference of pressure between the testing area(s) and the open loop airflow pathways and/or ambient environment, thereby indicating leaking between the same. Transference above a predetermined threshold may trigger an alert, such as determined and/or generated by the controller 22. The threshold may be any amount but may be on the order of 10's or 100's of pascals in exemplary embodiments.

Figure 10:
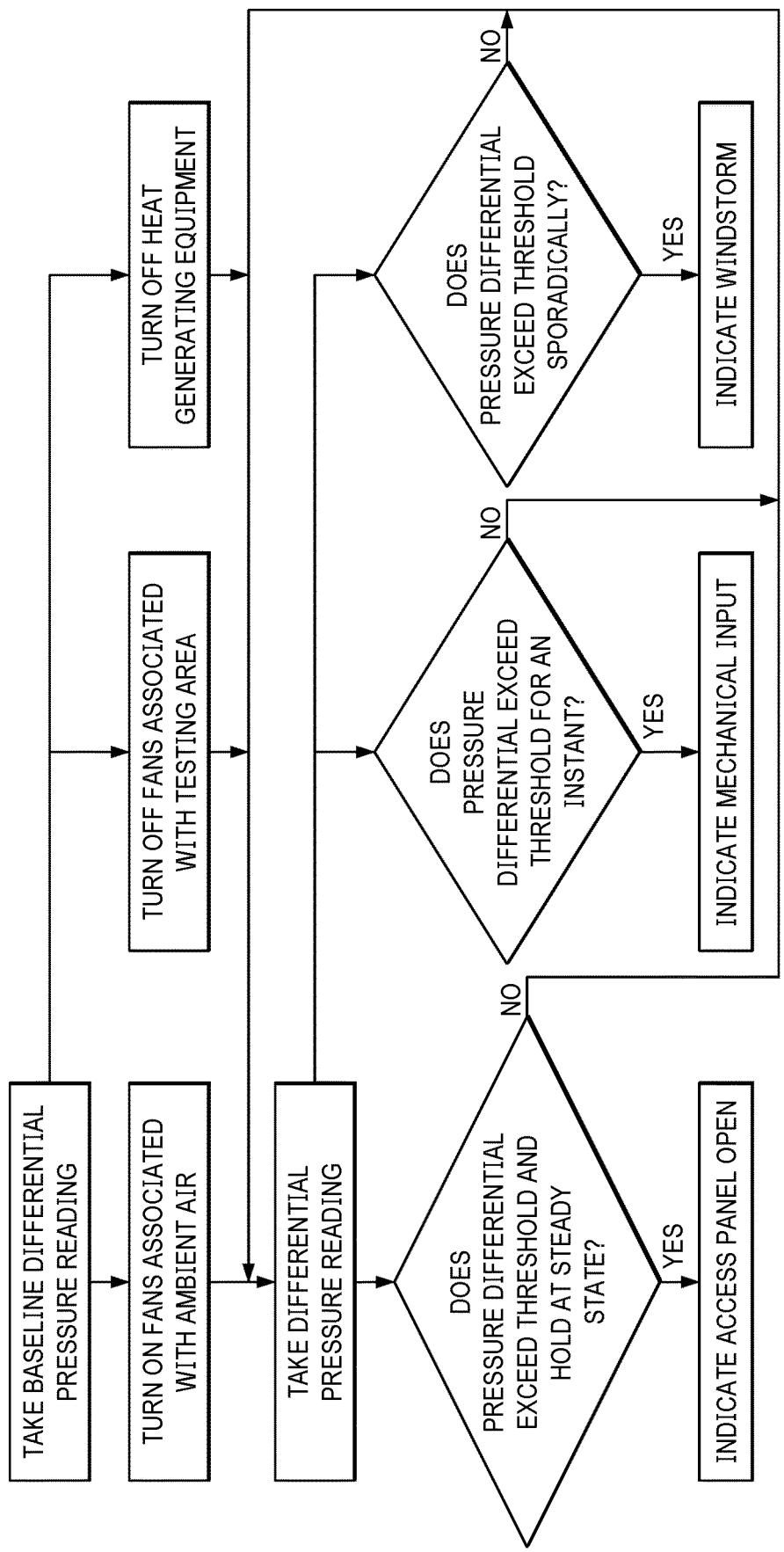
FIG. 10 is a flow chart with exemplary logic for determining various operational conditions of the electronic display assembly of FIG. 1.

FIG. 10 is a flow chart with exemplary logic for performing operational tests of the electronic display assembly 10. The same or similar procedures as shown and/or described with regard to FIG. 9 may be followed. Where the differential pressure readings meet or exceed a predetermined threshold, which may be the same as or different from the threshold(s) used for the transference test, and continues for a predetermined period of time (e.g., several seconds or minutes), such as determined by the controller 22 for example, without limitation, an alert may be generated that an access panel associated with the testing area is open. Opening the access panel may create a pressure change outside of normal parameters because the testing area is no longer well sealed. Where the differential pressure readings meet or exceed the same or different predetermined threshold for a relatively short period of time (e.g., less than several seconds, or less than 1 second), such as determined by the controller 22 for example, without limitation, an alert may be generated indicating that mechanical input is likely occurring (e.g., vandalism, shaking, or the like). Mechanical input may temporarily shrink or expand the available volume of the testing area, thereby temporarily increasing or decreasing pressure relative to ambient air. Where the differential pressure readings meet or exceed the same or different predetermined threshold sporadically, such as determined by the controller 22 for example, without limitation, this may indicate the presence of a windstorm, which may bring associated rapid changes to ambient pressures. Alerts or other notifications regarding such determinations may be provided, such by way of the controller 22, for example, without limitation. Differential pressures may be monitored on demand and/or on an ongoing basis to make such determinations. The thresholds may be any amount but may be on the order of 10's or 100's of pascals in exemplary embodiments, without limitation.

Figure 11:
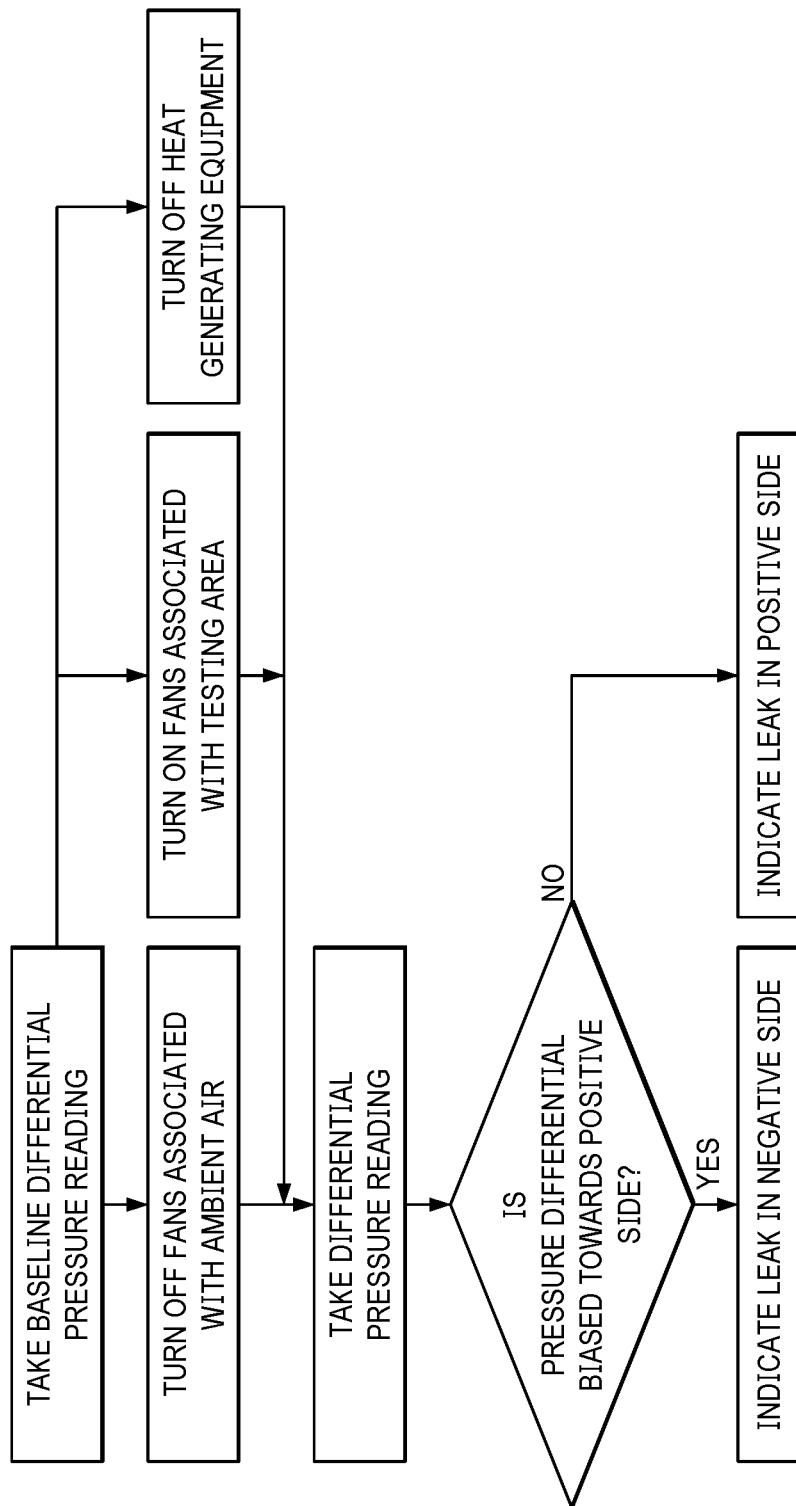
FIG. 11 is a flow chart with exemplary logic for performing a bias test of the electronic display assembly of FIG. 1.

FIG. 11 is a flow chart with exemplary logic for performing a bias test of the electronic display assembly 10. Optionally, a baseline or steady-state differential pressure reading may be taken based on normal operations of the unit 10. A differential pressure reading may be taken at multiple locations, such as on either side of one or more of the closed loop fans 20. One side of each closed loop fan 20 may be configured to create a pressure drop to create airflow by design. As such, each closed loop fan 20 may have a first side or portion associated with a positive pressure, and a second side or portion associated with a negative pressure. Alternatively, or additionally, a single differential pressure reading may be taken on either side of the one or more closed loop fans 20. For example, without limitation, the differential pressure sensor(s) 24 may be in fluid communication with portions of the testing area on either side of the closed loop fans 20. As another example, without limitation, the pressure sensors 25a, 25b may be placed on either side of the closed loop fans 20.

The open loop fans 18 may be deactivated (e.g., operated at 0% speed, less than 1% speed) and/or operated at minimal levels (e.g., less than 5%, less than 10%). The closed loop fans 20 may be operated at maximum (e.g., operated at 100% speed) and/or high levels (e.g., above 95%, above 90% speed). This may create a pressure drop across the closed loop fans 20 (e.g., positive pressure on one side, negative on the other). Optionally, some or all heat generating equipment of the unit 10, such as, but not limited to, the electronic display subassembly 14 or components thereof (e.g., any backlight or other illumination elements), may be deactivated to prevent heat buildup while the closed loop fans 20 are deactivated or operated at minimal levels. Such conditions may be created by commands from the controller 22, for example, without limitation. A pressure or differential pressure reading may be taken at multiple locations, such as on either side of one or more of the closed loop fans 20.

Where the pressure or differential pressure readings indicate a bias towards the positive pressure side of the closed loop fans 20, this may indicate a leak in the negative pressure side of the closed loop fans 20. Where the pressure or differential pressure readings indicate a bias towards the negative pressure side of the closed loop fans 20, this may indicate a leak in the positive pressure side of the closed loop fans. For example, without limitation, where the pressure or differential pressure on the positive pressure side of the closed loop fans 20 increases by 300 Pa and the pressure or differential pressure of the negative pressure side of the closed loop fans 20 decreases by 100 Pa, bias towards the positive pressure side of the closed loop fans 20 may be established indicating a leak of the negative pressure side of the closed loop fans 20 due to the relatively well sealed positive pressure side and the relatively not well sealed negative pressure side of the testing area. As another example, without limitation, where the pressure or differential pressure on the negative pressure side of the closed loop fans 20 decreases by 300 Pa and the pressure or differential pressure of the negative pressure side of the closed loop fans 20 increases by 100 Pa, bias towards the negative pressure side of the closed loop fans 20 may be established indicating a leak of the positive pressure side of the closed loop fans 20 due to the relatively well sealed negative pressure side and the relatively not well sealed positive pressure side of the testing area.

While differential pressure readings are discussed in several places, non-differential pressure readings may alternatively or additionally be utilized, such as by pressure sensors 25 in lieu of, or in addition to, differential pressure sensors 24. Differential pressure readings and sensors may be used as they may be more representative of pressure changes resulting from leakage. For example, ambient pressure may vary significantly during normal operations due to ambient pressure changes resulting from fronts, winds, and/or other weather events as well as fluctuations caused by operation of the open loop fans 18. Pressure of circulating gas may also change with such weather events and/or operation of the closed loop fans 20. Because it may be impossible, difficult, or impractical to prove an entirely gas impermeable seal between the closed loop portions and ambient or open loop portions of the unit 10, such pressure changes may result in pressure variations throughout some or all of the unit 10. Thus, a change in differential pressure may be a more accurate representation of leakage or changes in the amount of seal in the testing area and/or any changes thereto.

The testing shown and/or described herein may be performed periodically, continuously, on demand, sporadically, combinations thereof, or the like. In exemplary embodiments, without limitation, such testing may be performed whenever appropriate conditions occur naturally or by chance. Alternatively, or additionally, such conditions and associated testing may be commanded. The conditions for testing, measurements, analysis, reports, combinations thereof, or the like, may be performed at or by the controller 22 in exemplary embodiments.

The testing shown and/or described herein may be performed at units 10 awaiting installation or already installed and operating in the field. In exemplary embodiments, without limitation, the baseline or steady-state differential pressure reading may be based on testing performed before or when the unit 10 was installed, and may be used for comparison against operational condition for the same or different units 10. The electrical connections shown and/or described herein may be direct or indirect. The closed loop airflow pathways (e.g., the testing areas) shown and/or described herein may be loops or enclosed areas where the circulating gas travels in a loop therein. The closed loop airflow pathways/testing areas may be any size or shape. Alternatively, or additionally, thresholds, baselines, or other readings may be determined by averages or other collective measures of the same or different units 10.

The use of differential pressure sensors 24 and/or pressure sensors 25 in testing or field use, such as an alternative to water shower testing, moisture sensing, combinations thereof, or the like, may provide more accurate and/or precise results. Such pressure sensing may be able to detect intrusion points not otherwise found in water shower testing, moisture sensing, combinations thereof, or the like. Alternatively, or additionally, such pressure sensing may provide a better indication of the location of the intrusion points, such as, but not limited to, on which side of one of the closed loop fans 20, which part of the closed loop airflow pathway, and/or which area of the unit 10 the intrusion point is located.

In exemplary embodiments, without limitation, pressures may be generated within the units 10 by way of one or more pumps or other mechanical devices. The pumps may be fluidly connected to portions of the units 10, such as, but not limited to, the closed loop airflow pathways, to generate pressures, such as positive pressures within the units 10. These pressures may be generated to perform various testing, such as, but not limited to, leak down testing in a manufacturing facility and/or in the field to name some non-limiting examples. This may advantageously permit testing in various circumstances and/or consistent and reliable testing measures.

Figure 12:
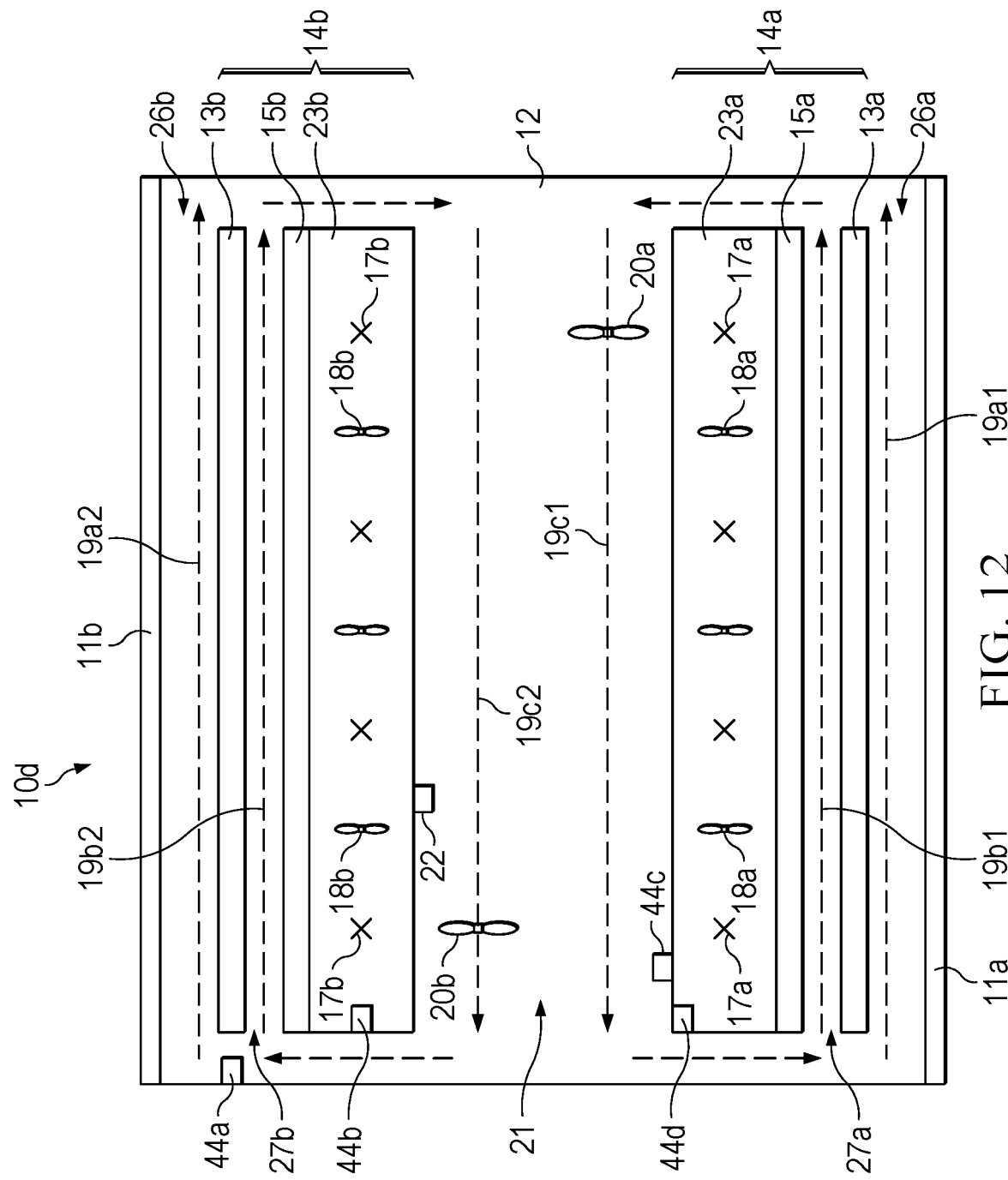
FIG. 12 is a simplified sectional view of another exemplary embodiment of the electronic display assembly of FIG. 1 taken along section line A-A.

FIG. 12 is another exemplary embodiment of airflow pathways within the units 10d. Some or all of the same or similar components used in the units 10-10c may be utilized in the unit 10d. Similar or the same components used in conjunction with the unit 10d, which may comprise multiple electronic display subassemblies 14, may use the same numbering with the addition of an "a", "b", "c", etc., and/or "1", "2", etc. (e.g., 14 to 14a, 14b, 30a to 30a1, 30a2). Each electronic display subassembly 14 may comprise a set or bank of one or more closed loop fans 20. For example, a first electronic display subassembly 14a (sometimes also referred to as the primary subassembly) may comprise a first set of one or more closed loop fans 20a. The same, or substantially the same, subassemblies 14 may be used for each side of the unit 10d. Each of the sets of closed loop fans 20 may be operated and/or controlled together or separately.

The first set of one or more closed loop fans 20a may be mounted to the first electronic display subassembly 14a. The first set of one or more closed loop fans 20a may comprise one or more centrifugal type fans mounted within or to a housing attached to a rear surface of the housing for the open loop airflow pathway 23a, though such is not necessarily required. In exemplary embodiments, without limitation, the first set of one or more closed loop fans 20a may be positioned adjacent to an entrance to the front chamber 26a and/or the illumination device chamber 27a of the first electronic display subassembly 14a, and may be configured to push circulating gas therethrough, such as to create the first and second portions 19a1, 19a2 of the flow of circulating gas, when activated. This may result in positive, or relatively high, pressures within one or more of the front chambers 26a and/or the illumination device chamber 27a.

The second set of one or more closed loop fans 20b may be mounted to the second electronic display subassembly 14b. The second set of one or more closed loop fans 20b may comprise one or more centrifugal type fans mounted within or to a housing attached to a rear surface of the housing for the open loop airflow pathway 23b, though such is not necessarily required. The second set of one or more closed loop fans 20b may be positioned adjacent to an entrance to the front chamber 26b and/or the illumination device chamber 27b and may be configured to push circulating gas therethrough, such as to create the first and second portions 19b1, 19b2 of the flow of circulating gas, when activated. This may result in positive, or relatively high, pressures within one or more of the front chambers 26b and/or the illumination device chamber 27b.

In this manner, at least some circulating gas 19c within a rear chamber 21 may travel in opposing directions. For example, without limitation, a first flow 19c1 of circulating gas exiting the front chamber 26a and/or illumination device chamber 27a of the first electronic display subassembly 14a may substantially flow in one direction, while a second flow 19c2 of circulating gas exiting the front chamber 26b and/or illumination device chamber 27b of the first electronic display subassembly 14b may substantially flow in an opposing direction. At least some of the circulating gas 19c may recirculate within a given one of the first and second electronic display subassemblies 14, and at least some of the circulating gas 19c may cross over between the first and second electronic display subassemblies 14. This may create a generally turbulent flow within the rear chamber 21.

While sometimes discussed as a first and second electronic display subassembly 14a, 14b, the unit 10d may comprise any number of electronic display subassemblies 14, each of which may comprise a set or bank of one or more fans 20. The rear passageway 21 may be common to at least two, or all of, the electronic display subassemblies 14. The electronic display subassemblies 14 may be provided within a common housing and/or mounted to a common structural framework 12 in exemplary embodiments.

Figure 13A:
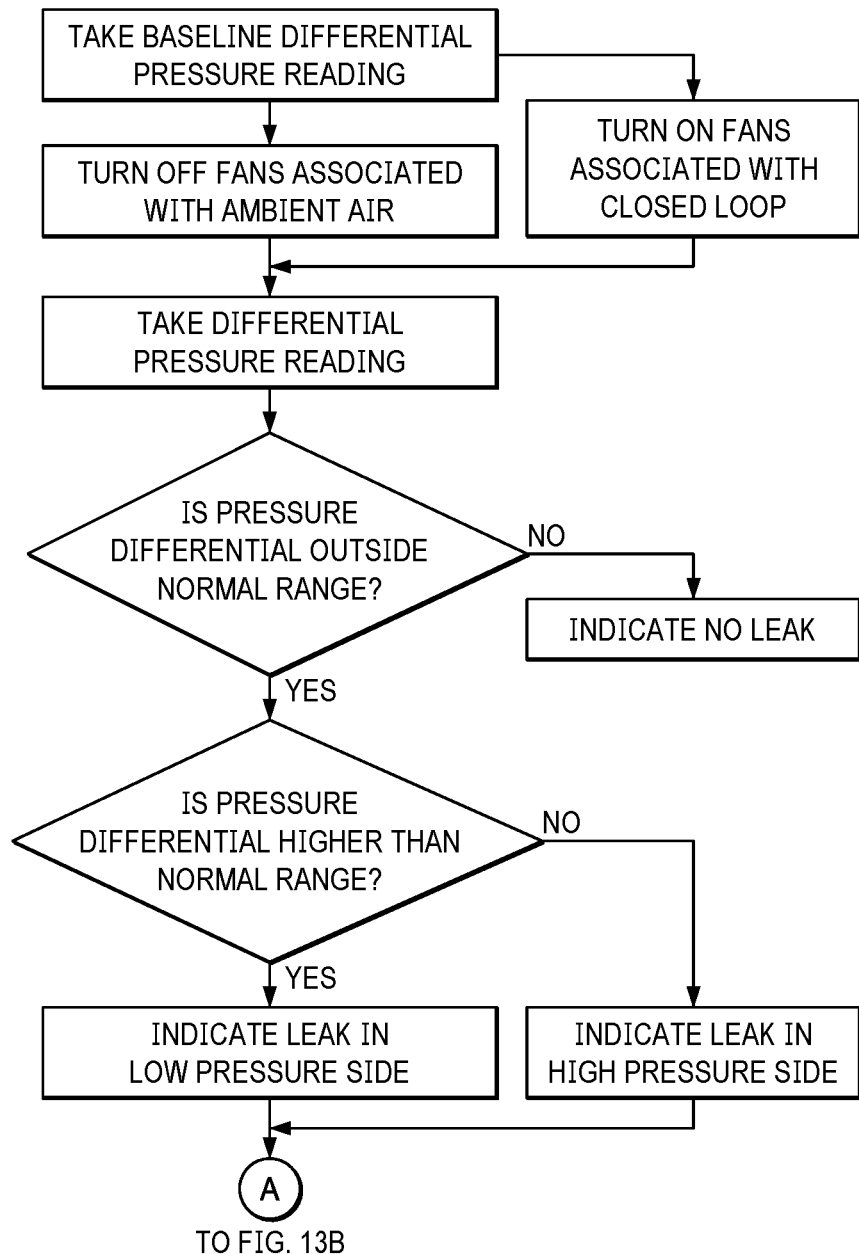
FIG. 13A is a flow chart with exemplary logic for performing a leak location identification test for the electronic display assembly of FIG. 1.
Figure 13B:
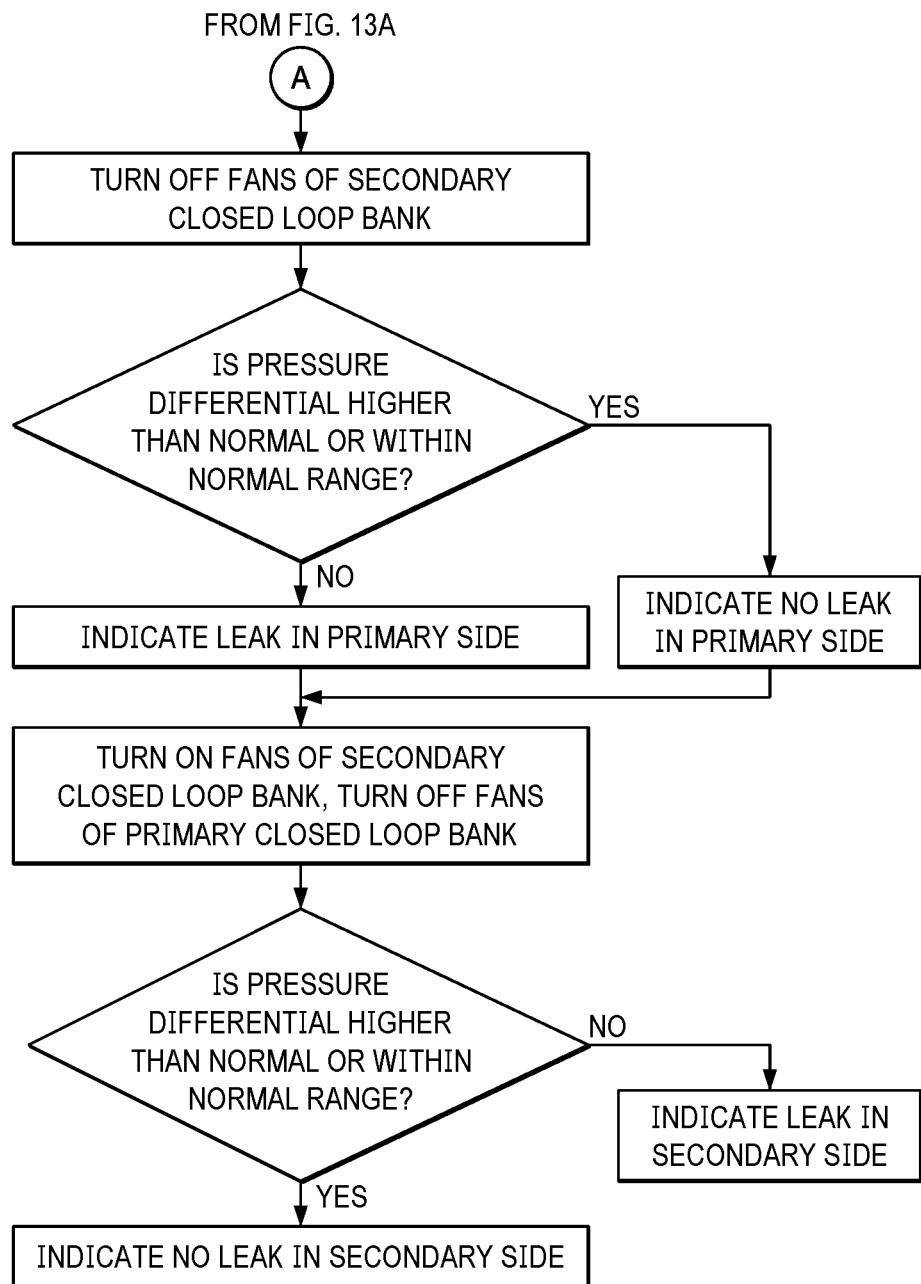
FIG. 13B is a continuation of the flow chart of FIG. 13B.

FIG. 13A through FIG. 13B illustrate testing procedures that may be utilized to identify a location of a leak between the various electronic display subassemblies 14. While sometimes discussed with regard to a first and second electronic display subassembly 14a, 14b, the procedure may be used with regard to any number of electronic display subassemblies 14 of a given unit 10d.

Differential pressure readings of the unit 10d, or a unit 10 of the same or substantially similar design, may be taken to establish a baseline, normal reading or range for such units 10d, such as while operating under various conditions (temperature, fan speed, etc.). Differential pressure readings may be subsequently taken, such as, but not limited to, as part of pre-installation testing, field testing, combinations thereof, or the like.

The open loop fans 18 may be turned off, or be left off. The closed loop fans 20 may be turned on, or left on. For example, the closed loop fans 20 may be operated at maximum (e.g., 100%) or relatively high (e.g., above 95%, above 90%) speed, and the open loop fans 18 may be operated at 0% or minimum (e.g., less than 5%) speed. If differential pressures are within a normal range for the display assembly 10d, then no leak may be indicated. If tested differential pressure is outside a normal range for the display assembly 10d on the low side, a leak may be determined in a lower pressure side for the display assembly 10d (e.g., the negative pressure side). This may be the intake side of the closed loop fan units 20. If tested differential pressure is outside a normal range for the display assembly 10d on the high side, a leak may be determined in a high pressure side of the display assembly 10b (e.g., the positive pressure side). This may be the exhaust side of the closed loop fan units 20.

The second set of one or more fans 20b associated with the second electronic display subassembly 14b (sometimes also referred to as the secondary subassembly) may remain, or be turned, off (e.g., operated at 0% speed), while the first set of one or more fans 20a associated with the first electronic display subassembly 14a (sometimes also referred to as the primary subassembly) may remain, or be turned, on (e.g., operated at 100% speed). If the pressure differential is higher than normal, or within a normal range, no leak may be noted in the primary side 14a. If the pressure differential is lower than normal, a leak in the primary side 14a may be indicated.

The first set of one or more fans 20a associated with the first electronic display subassembly 14a may subsequently be turned, or remain, off (e.g., operated at 0% speed) while the second set of one or more fans 20b associated with the second electronic display subassembly 14b may remain, or be turned, on (e.g., operated at 100% speed). If the pressure differential is higher than normal, or within a normal range, no leak may be noted in the secondary side 14b. If the pressure differential is lower than normal, a leak in the secondary side 14b may be indicated.

This procedure may permit presence and location of any leaks to be further identified. This procedure may be repeated any number of times for any number of subassemblies 14. The procedure may be performed in any order. For example, the secondary side 14b may be tested before the primary side 14a, or vice versa. Certain steps may be repeated, omitted, or performed out of order.

The leak location or other indications may be made at the unit 10d, such as by display at one or more of the electronic display layers 13, or reported to one or more remote electronic devices 30, such as by way of the network 28 and/or the network communication devices 29. While differential pressures are sometimes discussed, absolute pressures may alternatively or additionally be utilized. Various fan speeds may be used for testing. For example, without limitation, while 100% fan speed may be utilized in some cases, a relatively high speed may alternatively be utilized (e.g., >89%). As another example, without limitation, while 0% fan speed may be utilized in some cases, a relatively low speed may alternatively be utilized (e.g., <10%).

FIG. 14 illustrates an exemplary data chart 60 for a unit 10 undergoing certain testing. The data chart 60 is a non-limiting example of the type or kind of chart that may be generated by the controller(s) 22, such as for display at the electronic device(s) 30. The sensors 44 may be sufficient to generate the data chart 60. The data chart 60 may reflect some or all of the steps shown and/or described with respect to any of FIGS. 7-11 and/or 13A-13B. In exemplary embodiments, without limitation, the data chart 60 may reflect a static leakdown test performed on a unit 10 in a controlled environment, such as pre-installation testing. The testing procedure may generally reflect the steps of FIGS. 8A-8B, without limitation.

As generally noted at item 62, leakdown time may be determined. As indicated generally at item 64, differential pressure changes due to changing fan 18 and/or 20 speed or other conditions may be recorded as temperature fluctuates, which affects pressure. As generally provided in the data chart 60, fan speed, especially of the open loop fans 18, may be highly correlated with differential pressure readings.

Figure 15:
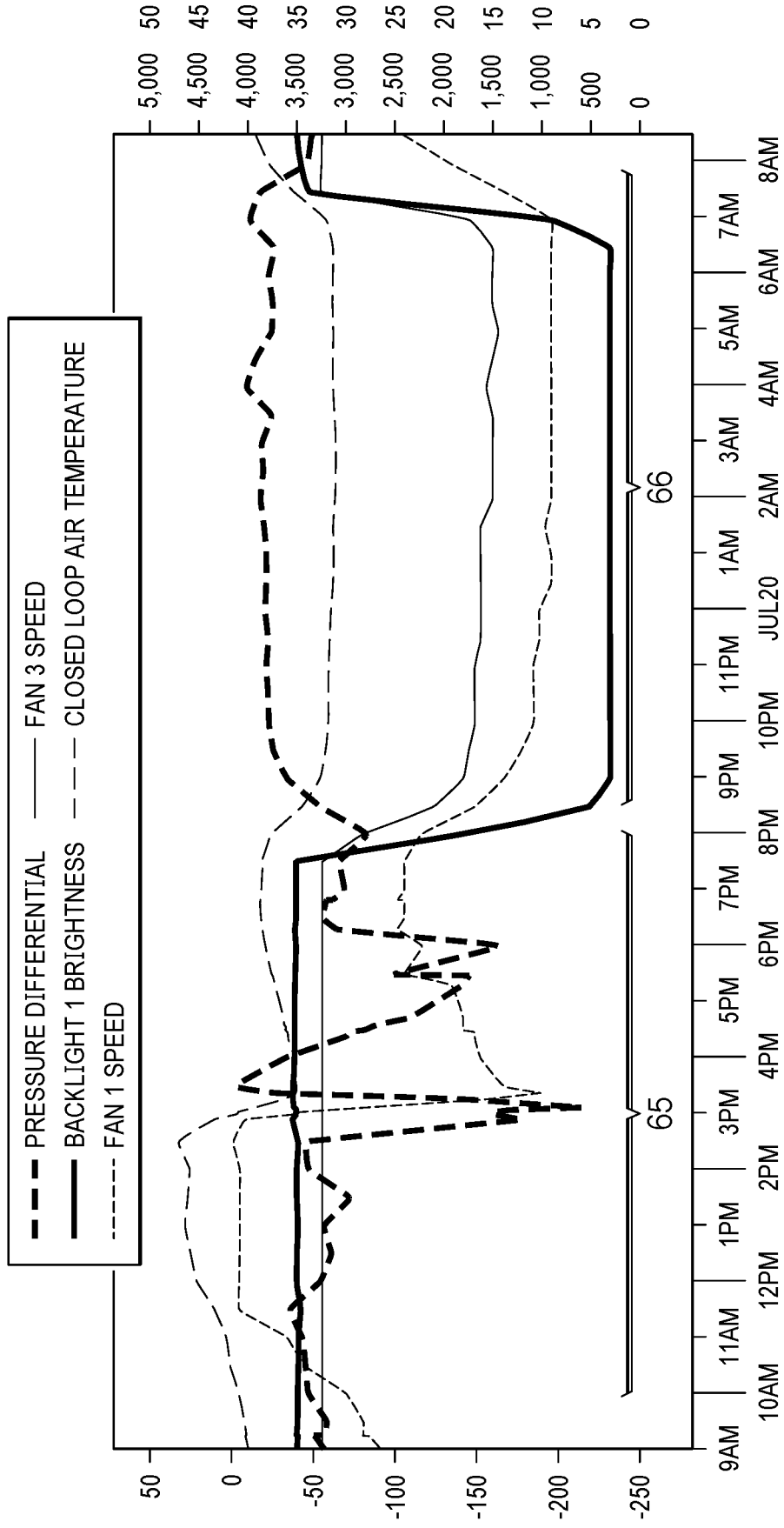
FIG. 15 illustrates another exemplary data chart for the electronic display assembly of FIG. 1 undergoing certain operations.

FIG. 15 illustrates an exemplary data chart 60' for a unit 10 undergoing certain operations. The data chart 60' is a non-limiting example of the type or kind of chart that may be generated by the controller(s) 22, such as for display at the electronic device(s) 30. The sensors 44 may be sufficient to generate the data chart 60'. In exemplary embodiments, without limitation, the data chart 60' may reflect a dynamic leakdown test performed on an operational unit 10. As generally indicated at item 65, a variety of differential pressures readings may be provided during normal daytime operations, such as in reflect of varying solar loads, backlight adjustment, weather conditions, combinations thereof, or the like. During nighttime hours, as generally indicated at item 66, when solar loading is minimal to non-existent, and in some cases, backlights may be turned off or dimmed significantly, differential pressure readings may be more consistent. The data chart 60' may represent a relatively well-sealed unit 10 not experiencing significant leaking. No alerts may be generated due to the type or kind of data received as illustrated in the data chart 60'.

Figure 16:
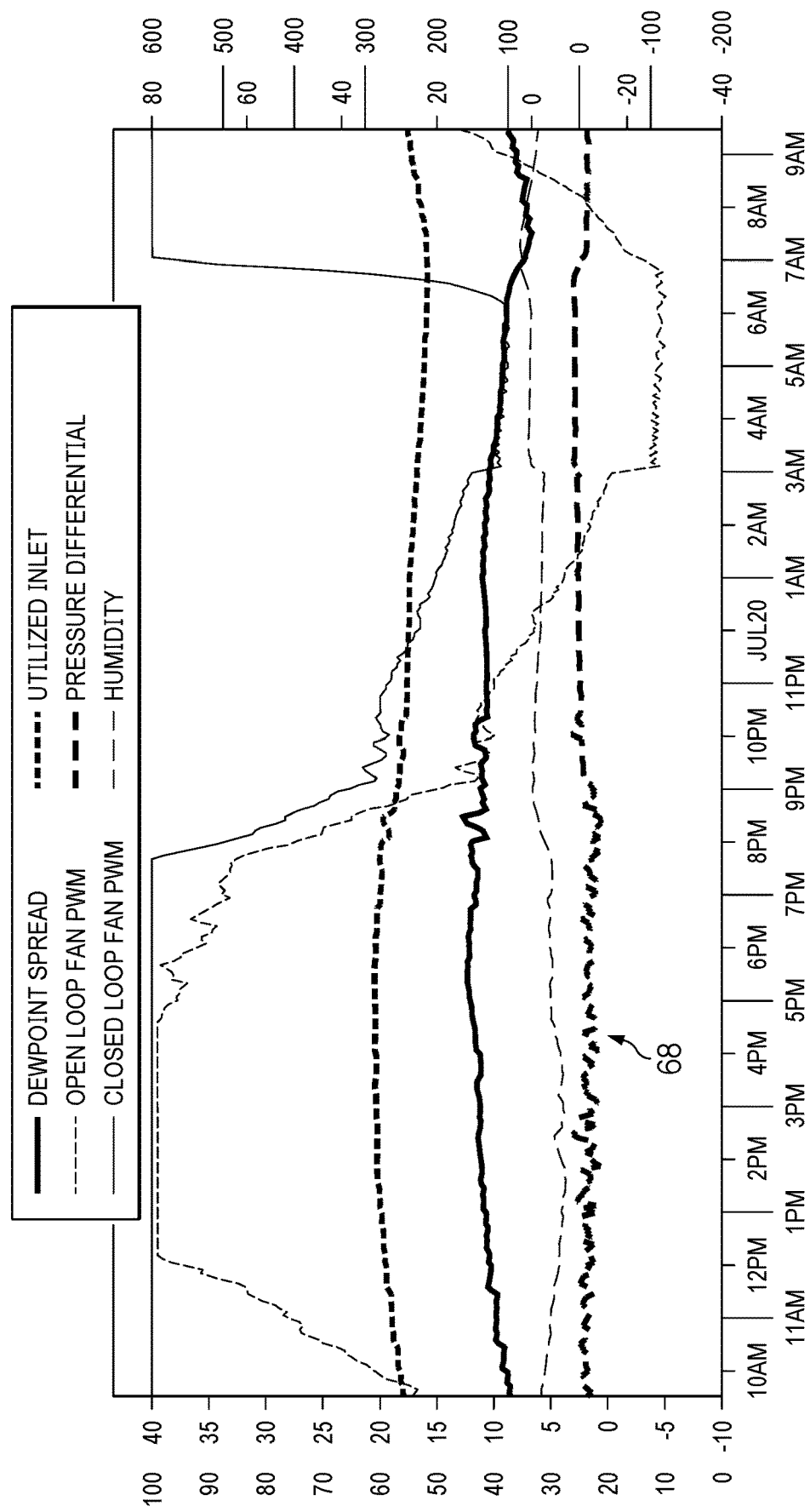
FIG. 16 illustrates another exemplary data chart for the electronic display assembly of FIG. 1 undergoing certain operations.

FIG. 16 illustrates an exemplary data chart 60" for a unit 10 undergoing certain operations. The data chart 60" is a non-limiting example of the type or kind of chart that may be generated by the controller(s) 22, such as for display at the electronic device(s) 30. The sensors 44 may be sufficient to generate the data chart 60". In exemplary embodiments, without limitation, the data chart 60" may reflect a dynamic leakdown test performed on an operational unit 10. As generally indicated at item 68, a fairly consistent differential pressures readings provided during normal daytime operations and/or nighttime operations. As the unit 10 might be expected to experience varying differential pressure readings during normal operations, the data chart 60" may reflect a less well-sealed unit and/or a leaking unit of concern. One or more alerts may be generated in response to the type or kind of data received as illustrated in the data chart 60".

Figure 17:
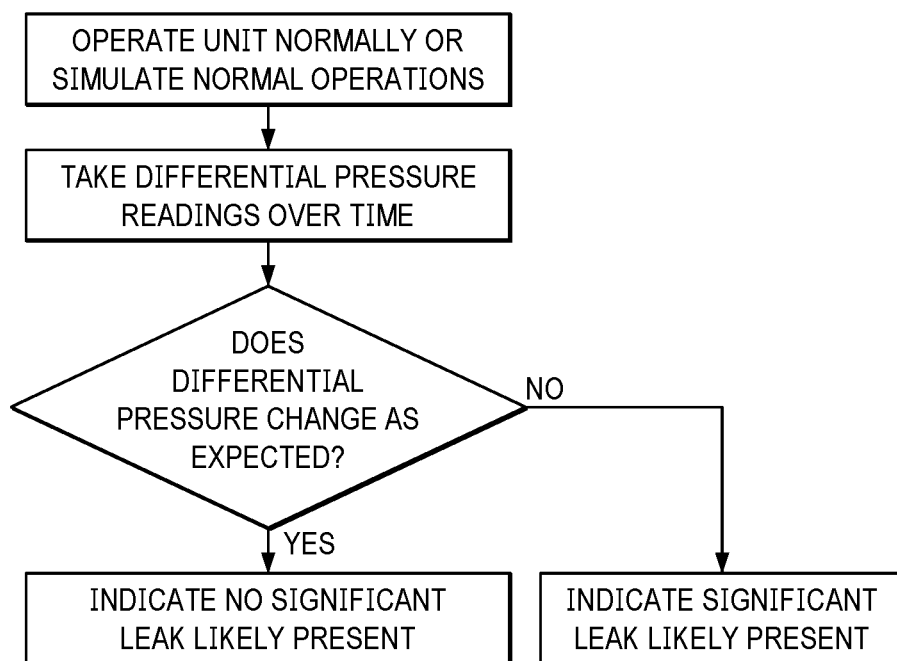
FIG. 17 is a flow chart with exemplary logic for performing a dynamic leakdown test of the electronic display assembly of FIG. 1.

FIG. 17 provides exemplary static leakdown testing procedures. The unit 10 may be operated normally. Alternatively, or additionally, normal operations may be artificially mimicked, such as in a shortened timeframe to simulate normal conditions. In this fashion, dynamic leakdown testing may be performed in fielded units or in controlled environments (e.g., pre-installation testing). Such normal, or simulated normal, operating conditions may include, for example, without limitation, simulated solar loading (e.g., by provided by one or more artificial light sources), changing fan 18 and/or 20 speed, adjusting backlight power levels, changing ambient air temperatures (e.g., using heaters, air conditioners, psychrometric testing chambers, etc.), combinations thereof, or the like. Where differential pressure readings change as expected, a determination may be made that no significant leaks are likely present. Where differential pressure readings do not change as expected, a determination may be made that one or more significant leaks are likely present.

One example of a simulated day may include, without limitation, operating the unit 10 for an hour with full daytime brightness and a white screen, and 100% closed loop fan 20 and open loop fan 18 fan speed, and transitioning to the short night, by dropping to nighttime brightness (~300 nits) and operating the fans 18 and 20 in a night mode (open loop fans 18 fans allowed to go to zero and only ramp up as required, and the closed loop fans 20 allowed to go as low as 30% and ramp up from there as required). This is merely exemplary and not intended to be limiting. For example, without limitation, any time periods, backlight levels, fan 18 and/or 20 speeds, cycles, combinations thereof, or the like, may be utilized. A relatively long static leakdown time may be correlated with a relatively long dynamic leakdown testing time, and a relatively short static leakdown time may correlate with a relatively short dynamic leakdown time. The difference in static and dynamic leakdown times may be multiple orders of magnitude (e.g., 10 minute static leakdown correlating to an hour of dynamic leakdown). A longer static and/or dynamic leakdown time may be associated with a better sealed unit 10.

Changes in differential pressure readings may be expected with changes in temperature. Changes in temperature may be expected when fans 18 and/or 20 are activated, deactivated, or changed in operational speed. Changes in temperature may, alternatively or additionally, be expected when power to the backlight is increased or decreased. Changes in temperature may, alternatively or additionally, be expected during different hours of the day and/or times of year, such as due to varying solar loading, weather conditions, night time conditions, day time conditions, combinations thereof, or the like. In this manner, changes in differential pressure readings may be expected with changes in any one or more of: temperature (ambient or otherwise), ambient lighting, fan 18 and/or 20 speed, time of day, time of year, weather conditions, backlight power, operational power draw, combinations thereof, or the like. Such changes in conditions may occur naturally, such as in fielded, operational units, or may be induced, such as by the controller(s) 22 and/or remote electronic device(s) 30 for testing.

The controller(s) 22 and/or remote device(s) 30 may be configured to automatically and/or electronically determine if sufficiently correlated changes in differential pressure are experienced, such as by way of review of the data charts 60, 60', or 60'". Where sufficiently correlated changes in differential pressure are experienced, no alert and/or an indication of no significant leak detected may be provided. Where sufficiently correlated changes in differential pressure are not experienced, an alert and/or an indication of the likely presence of a significant leak may be provided. Comparisons may be made in discrete instances, such as against objective criteria, and/or against a baseline established from review of historical information, by way of non-limiting example.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A system for leak testing an electronic display assembly, said system comprising:
    the electronic display assembly comprising a testing area, a differential pressure sensor configured to detect a differential pressure between ambient air of an ambient environment and gas within the testing area, an illumination device, an open loop airlfow pathway, one or more fans associated with the open loop aiflow pathway and configured to ingest, circulate, and exhaust a flow of the ambient air through the open loop airlfow pathway when operated, a closed loop airflow pathway comprising the testing area, and one or more fans associated with the closed loop airflow pathway and configured to circulate the gas through the closed loop airflow pathway when operated;
    a controller in electronic communication with the differential pressure sensor and configured to:
        turn off the illumination device, the one or more fans associated with the open loop airflow pathway and the one or more fans associated with the closed loop airflow pathway and take a differential pressure reading the differential pressure sensor to determine a baseline differential pressure reading;
        determine differential pressure readings for the electronic display assembly based on data received from the differential pressure sensor; and
        selectively generate electronic notifications based on said differential pressure readings.

2. The system of claim 1 wherein:
    the controller is configured to generate a first one of the electronic notifications indicating that the leak testing is failed where the differential pressure readings for the electronic display assembly fall outside of the baseline differential pressure reading by at least a threshold.

3. The system of claim 1 wherein:
    the controller is configured to generate a second one of the electronic notifications indicating that the leak testing is passed where the differential pressure readings for the electronic display assembly fall below the baseline differential pressure reading or within a margin of the baseline differential pressure reading.

4. The system of claim 1 wherein:
    the controller is configured to:
        generate a first one of the electronic notifications indicating an open access panel for the electronic display assembly where the differential pressure readings fall outside the baseline differential pressure reading and holds at steady state;
        generate a second one of the electronic notifications indicating mechanical input where the differential pressure readings fall outside the baseline differential pressure reading for less than a predetermined amount of time; and
        generate a third one of the electronic notifications indicating a windstorm where the differential pressure readings fall outside of the baseline differential pressure reading sporadically.

5. The system of claim 1 wherein:
    the differential pressure sensor is placed on a given side of the one or more fans associated with the closed loop airflow pathway, where the given side is selected from the group consisting of: a positive pressure side and a negative pressure side;
    the controller is configured to generate a first one of the electronic notifications indicating a leak detected in the negative pressure side of one or more fans associated with the closed loop airflow pathway where the differential pressure readings are biased towards the positive side; and
    the controller is configured to generate a second one of the electronic notifications indicating a leak detected in the positive pressure side of one or more fans associated with the closed loop airflow pathway where the differential pressure readings are biased towards the negative side.

6. The system of claim 1 wherein:
    the controller is located at the electronic display assembly.

7. The system of claim 1 wherein:
    the electronic display assembly comprises a cover and a liquid crystal layer;
    the illumination device comprises a backlight for the liquid crystal layer comprising multiple light emitting diodes;
    the closed loop airflow pathway passes in front of and behind the liquid crystal layer; and
    the open loop airflow pathway extends along a rear surface of the backlight.

8. The system of claim 1 wherein:
    the controller is configured to:
        change any one or more of: power supplied to the illumination device, operational speed of the one or more fans associated with the open loop airflow pathway, and operational speed of the one or more fans associated with the closed loop airflow pathway;
        monitor the differential pressure readings for associated changes; and
        generate said electronic notifications where said associated changes are not found.

9. The system of claim 1 wherein:
    the controller is configured to:

start a timer where data is received indicating that a pressure change is induced;
stop the timer when steady state differential pressure readings are determined; and
generate a first one of the electronic notifications indicating that the leak testing is failed where an elapsed time falls below a target;
the steady state differential pressure readings are determined where the differential pressure readings match the baseline, within a predetermined margin.

10. The system of claim 9 wherein:
the controller is configured to generate a second one of the electronic notifications indicating that the leak testing is passed where the elapsed time exceeds the target.

11. The system of claim 9 further comprising:
a pump fluidly connected to the testing area and configured to induce the pressure change when activated.

12. The system of claim 9 further comprising:
a structural framework forming part of said electronic display assembly; and
a side assembly moveably mounted to said structure framework, wherein the pressure change is induced by moving said side assembly between an opened position and a closed position.

13. The system of claim 1 wherein:
the controller is configured to generate a first one of the electronic notifications indicating a leak detected in a low pressure side of the electronic display assembly where the differential pressure readings are higher than a normal range; and
the controller is configured to generate a first one of the alerts indicating a leak in a high pressure side of the electronic display assembly where the differential pressure readings are lower than the normal range.

14. The system of claim 13 wherein:
the electronic display comprises a primary side and a secondary side, where said testing area comprises a first area in said primary side and a second area in said secondary side, and where the one or more fans associated with the closed loop airflow pathway comprise at least one fan associated with the primary side and at least one fan associated with the secondary side;
the controller is configured to:
turn off the at least one fan associated with the secondary side;
take additional ones of the differential pressure readings; and
generate additional one or ones of the electronic notifications indicating a leak detected in the secondary side where the additional ones of the differential pressure readings are lower than the normal range.

15. The system of claim 14 wherein:
the controller is configured to generate additional one or ones of the electronic notifications indicating a leak detected in the primary side where the additional ones of the differential pressure readings are within the normal range or higher than the normal range.

16. An electronic display assembly configured to facilitate leak testing, said electronic display assembly comprising:
a housing;
an electronic display located within the housing;
a closed loop airflow pathway for circulating gas extending within the housing and comprising a testing area;
a differential pressure sensor fluidly connected to said testing area and an ambient environment, wherein said differential pressure sensor is configured to detect a differential pressure between ambient air and the circulating gas;
fans located within the housing;
a controller in electronic communication with the differential pressure sensor, the one or more fans associated with the open loop airflow pathway, and the one or more fans associated with the closed loop airflow pathway, said controller configured to:
determine a baseline differential pressure reading by turning off the fans and an illumination device associated with the electronic display and subsequently taking a differential pressure reading from the differential pressure sensor;
take operational differential pressure readings for the testing area way of the differential pressure sensor while the fans and the illumination device are active; and
generate an electronic notification indicating a suspected leak where the operational differential pressure readings are maintained within a margin of the baseline differential pressure reading.

17. The electronic display assembly of claim 16 wherein:
the controller is configured to determine a location associated with the suspected leak based on the operational differential pressure readings relative to the baseline differential pressure reading, wherein the location is selected from the group consisting of: a positive pressure side and a negative pressure side, and wherein the electronic notification indicates the location.

18. An electronic display assembly configured to facilitate leak testing of said assembly, said assembly comprising:
a housing;
an electronic display located within the housing and comprising a display layer and a light source;
an airflow pathway for circulating gas extending within the housing and including a testing zone;
at least one differential pressure sensor fluidly connected to said testing zone and an ambient environment, wherein said at least one differential pressure sensor is configured to detect a differential pressure between ambient air and the circulating gas;
one or more fans located within the housing; and
a controller in electronic communication with the at least one differential pressure sensor, said controller configured to:
determine a baseline differential pressure reading from the at least one differential pressure sensor when said one or more fans are all off;
start a timer upon receipt of an indication of an induced pressure change;
take subsequent differential pressure readings by way of the at least one differential pressure sensor in the testing zone;
stop the timer when a predetermined subsequent differential pressure reading is received, wherein said time between starting the timer and stopping the timer establishes an elapsed time; and
generate an alert indicating a failed leak test where the elapsed time falls below a predetermined target amount of time.

19. A system for leak testing an electronic display assembly, said system comprising:
the electronic display assembly comprising a testing area and a differential pressure sensor configured to detect a differential pressure between ambient air of an ambient environment and gas within the testing area;

a controller in electronic communication with the differential pressure sensor and configured to:
  determine differential pressure readings for the electronic display assembly based on data received from the differential pressure sensor;
  selectively generate electronic notifications based on said differential pressure readings;
  generate a first one of the electronic notifications indicating a leak detected in a low pressure side of the electronic display assembly where the differential pressure readings are higher than a normal range; and
the controller is configured to generate a first one of the alerts indicating a leak in a high pressure side of the electronic display assembly where the differential pressure readings are lower than the normal range.

* * * * *

UNITED STATES PATENT AND TRADEMARK OFFICE
CERTIFICATE OF CORRECTION

PATENT NO. : 11,921,010 B2
APPLICATION NO. : 17/872756
DATED : March 5, 2024
INVENTOR(S) : Dunn et al.

It is certified that error appears in the above-identified patent and that said Letters Patent is hereby corrected as shown below:

On the Title Page

Item (56), References Cited, U.S. Patent Documents, please delete "2002/0163513 A1 11/2022 Tsuj" and insert -- 2002/0163513 A1 11/2022 Tsuji --.

In the Claims

In Column 19, Line 55, Claim 1, please delete "reading the" and insert -- reading from the --.

Signed and Sealed this
Twenty-third Day of April, 2024

Katherine Kelly Vidal
*Director of the United States Patent and Trademark Office*